US009445404B2

(12) United States Patent
Wu et al.

(10) Patent No.: US 9,445,404 B2
(45) Date of Patent: Sep. 13, 2016

(54) METHOD, BASE STATION, AND USER EQUIPMENT FOR TRANSMITTING CONTROL CHANNEL

(71) Applicant: Huawei Technologies Co., Ltd., Shenzhen, Guangdong (CN)

(72) Inventors: Qiang Wu, Beijing (CN); Jianghua Liu, Beijing (CN); Chi Gao, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 194 days.

(21) Appl. No.: 14/490,520

(22) Filed: Sep. 18, 2014

(65) Prior Publication Data

US 2015/0003401 A1 Jan. 1, 2015

Related U.S. Application Data

(63) Continuation of application No. PCT/CN2012/072544, filed on Mar. 19, 2012.

(51) Int. Cl.
*H04W 72/04* (2009.01)
*H04L 5/00* (2006.01)

(52) U.S. Cl.
CPC ........ *H04W 72/0406* (2013.01); *H04L 5/0007* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 8,625,509 B2* | 1/2014 | Ahn | H04L 5/0016 370/208 |
| 8,665,806 B2 | 3/2014 | Wang et al. | |
| 8,908,651 B2* | 12/2014 | Noh | H04L 1/0083 370/335 |
| 2010/0195583 A1 | 8/2010 | Nory et al. | |
| 2010/0284353 A1 | 11/2010 | Wu et al. | |
| 2011/0280201 A1* | 11/2011 | Luo | H04W 72/0406 370/329 |
| 2012/0178360 A1* | 7/2012 | Park | H04B 7/155 455/7 |

(Continued)

FOREIGN PATENT DOCUMENTS

| | | |
|---|---|---|
| CN | 101409605 A | 4/2009 |
| CN | 101771462 A | 7/2010 |

(Continued)

OTHER PUBLICATIONS

"UE-specific search space for ePDCCH", Huawei, HiSilicon, 3GPP TSG RAN WG1 Meeting #68 bis, Mar. 26-30, 2012, 5 pages.

(Continued)

*Primary Examiner* — Min Jung

(57) ABSTRACT

The present invention provides a method, base station, and user equipment for transmitting a control channel. Grouping is performed, according to an aggregation level of the to-be-transmitted control channel, on sub-blocks in physical resource blocks configured by the base station for the to-be-transmitted control channel, then interleaving is performed, and then candidate control channels are mapped to the interleaved sub-blocks, so that any candidate control channel of the to-be-transmitted control channel is sent on consecutive time-frequency resources as possible, and meanwhile different candidate control channels are on different PRB pairs as possible. In this way, the base station may have better flexibility during actual sending of the ePDCCH, thereby not only achieving a precoding gain and facilitating better transmission of control information, but also achieving a larger scheduling gain.

20 Claims, 14 Drawing Sheets

(56) References Cited

U.S. PATENT DOCUMENTS

| | | | | |
|---|---|---|---|---|
| 2013/0010685 A1* | 1/2013 | Kim | .................... | H03M 13/271 370/315 |
| 2013/0064099 A1* | 3/2013 | Kim | .................... | H04L 5/0053 370/241 |
| 2013/0083740 A1* | 4/2013 | Eriksson | ............... | H04L 1/1861 370/329 |
| 2014/0307700 A1* | 10/2014 | Seo | ...................... | H04L 5/0053 370/329 |

FOREIGN PATENT DOCUMENTS

| | | |
|---|---|---|
| CN | 101778394 A | 7/2010 |
| CN | 102340370 A | 2/2012 |
| WO | WO 2009/098568 A2 | 8/2009 |
| WO | WO 2011/159132 A2 | 12/2011 |

OTHER PUBLICATIONS

Erik Dahlman, et al., "4G LTE/LTE-Advanced for Mobile Broadband-Chapter 10", Mar. 29, 2011, pp. 145-202.

"Considerations on search spaces for the E-PDCCH", Nokia, Nokia Siemens Networks 3GPP TSG RAN WG1 #68 Meeting, Feb. 6-10, 2012, 5 pages.

"Mapping Desing for E-PDCCH in Rel-11", NTT DOCOMO, 3GPP TSG RAN WG1 Meeting #68, Feb. 6-10, 2012, 7 pages.

"Search Space Design for E-PDCCH", Research in Motion, UK Limited, 3GPP TSG RAN WG1 Meeting #68, Feb. 6-10, 2012, 6 pages.

"3rd Generation Partnership Project; Technical Specification Group Radio Access Network; Evolved Universal Terrestrial Radio Access (E-UTRA); Physical Channels and Modulation (Release 10)", 3GPP TS 36.211 V10.4.0, Dec. 2011, 88 pages.

"3rd Generation Partnership Project; Technical Specification Group Radio Access Network; Evolved Universal Terrestrial Radio Access (E-UTRA); Physical layer procedures (Release 10)", 3GPP TS 36.213 V10.5.0, Mar. 2012, 125 pages.

* cited by examiner

METHOD, BASE STATION, AND USER EQUIPMENT FOR TRANSMITTING CONTROL CHANNEL

CROSS-REFERENCE TO RELATED APPLICATIONS

This application is a continuation of International Application No. PCT/CN2012/072544, filed on Mar. 19, 2012, which is hereby incorporated by reference in their entirety.

TECHNICAL FIELD

The present invention relates to a communications technology, and in particular, to a method, a base station, and a user equipment for transmitting a control channel.

BACKGROUND

In a 3rd Generation Partnership Project (3rd Generation Partnership Project, 3GPP) Long Term Evolution (Long Term Evolution, LTE) or LTE-advanced (LTE-advanced, LTE-A) system, a downlink multiple access manner generally adopts an orthogonal frequency division multiplexing multiple access (Orthogonal Frequency Division Multiple Access, OFDMA) manner. A downlink resource of the system is divided into an orthogonal frequency division multiplexing multiple access (Orthogonal Frequency Division Multiple, OFDM) symbol in terms of time, and is divided into a sub-carrier in terms of frequency.

According to an LTE Release 8/9/10 (LTE Release 8/9/10) standard, a normal downlink subframe includes two time slots (slot), each time slot has 7 OFDM symbols, and a normal downlink subframe has a total of 14 or 12 OFDM symbols. The LTE Release 8/9/10 standard also defines a size of a resource block (Resource Block, RB), where an RB includes 12 sub-carriers on a frequency domain, and is of a duration of a half subframe (a time slot) on a time domain, that is, 7 or 6 OFDM symbols are included. On a subframe, a pair of RBs of two time slots is called a resource block pair (RB pair, RB pair). In actual transmission, a resource block pair used on a physical resource (a physical RB pair) is also called a physical resource block pair (Physical RB pair, PRB pair). A PRB pair is generally called a PRB for short, so that in the following description, a PRB, a PRB pair, a physical resource block, and a physical resource block pair all refer to a PRB pair.

Various data borne on a subframe is mapped by dividing a physical time-frequency resource of the subframe into various physical channels. The various physical channels are mainly classified into two types: control channels and service channels. Correspondingly, data borne by a control channel may be called control data (or control information), and data borne by a service channel may be called service data. A fundamental purpose of sending a subframe is to transmit the service data, and a function of the control channel is to help transmission of the service data.

A complete physical downlink control channel (Physical Downlink Control Channel, PDCCH) is formed by one or several control channel elements (Control Channel Element, CCE). According to the LTE Release 8/9/10, a PDCCH may be formed by 1, 2, 4, or 8 CCEs, which correspond to aggregation levels 1, 2, 4, and 8 respectively.

In an LIE system, because of introduction of technologies such as multiple user multiple input multiple output (Multiple Input Multiple Output, MIMO) and coordinated multiple points (Coordinated Multiple Points, CoMP), control channel capacity is limited, so that a PDCCH transmitted based on an MIMO precoding manner (called an ePDCCH below) is introduced. The ePDCCH may be demodulated based on a UE-specific reference signal-demodulation reference signal (Demodulation Reference Signal, DMRS).

For the ePDCCH, each ePDCCH is still formed by k logical elements (defined as an eCCE herein) similar to the CCE, and a user equipment needs to perform blind detection on a terminal side. Following a definition of the aggregation level in the PDCCH, an ePDCCH with the aggregation level being L (L=1, 2, 4, 8) is formed by L eCCEs.

Manners in which a base station transmits the ePDCCH include two transmission manners, namely, centralized or localized (localized) and distributed (distributed) transmission manners. In the centralized or localized transmission manner, control channels of the ePDCCH may be allocated to consecutive time-frequency resources, and meanwhile the base station sends the ePDCCH to a UE by using beamforming or precoding, so as to obtain a beamforming/precoding gain. In the distributed transmission manner, control channels of the ePDCCH may be allocated to discrete time-frequency resources, so as to obtain a (frequency) diversity gain.

For the centralized or localized transmission manner, before sending the ePDCCH to the user equipment, the base station first configures a search space, that is, a PRB pair, for the to-be-transmitted ePDCCH, and 4 eCCEs may be placed in each PRB pair. Then, for the to-be-transmitted ePDCCH, one of candidate positions is selected from front to back according to an arrangement order of the PRB pair to place the ePDCCH to perform transmission, which is not conducive to better sending of control information.

For example, for an ePDCCH that bears control information and has an aggregation level of 1, the base station configures a total of four PRB pairs including a PRB pair 3, a PRB pair 4, a PRB pair 8, and a PRB pair 9. According to the foregoing method, the base station transmits the ePDCCH only on the PRB pair 3 and the PRB pair 4. Even if the base station learns, through feedback of the UE, that channels of the PRB pair 8 and the PRB pair 9 are better, the ePDCCH with the aggregation level being 1 cannot be sent on the PRB pair 8 or the PRB pair 9.

SUMMARY

Embodiments of the present invention provide a method, a base station, and a user equipment for transmitting a control channel, so as to improve flexibility of control channel resource configuration, thereby facilitating better sending of control information.

In a first aspect, an embodiment of the present invention provides a method for transmitting a control channel, which includes:

determining m physical resource blocks for transmitting a control channel, where any physical resource block among the m physical resource blocks includes n sub-blocks, any sub-block among the n sub-blocks can be used for placing a control channel element, m>=1, and n>=1;

determining, according to an aggregation level L of the to-be-transmitted control channel, the number M of candidate control channels, and using L control channel elements to bear to-be-transmitted control information, where L>=1, and L is an integer;

grouping m×n sub-blocks of the m physical resource blocks, and obtaining Q interleave elements, where an interleave element includes L consecutive sub-blocks, Q=floor(m×n/L), and floor represents rounding down;

performing interleaving on the Q interleave elements;

mapping the M candidate control channels to M interleave elements among the Q interleave elements that are interleaved; and sending the L control channel elements by placing them in 1 interleave element among the M interleave elements.

In a second aspect, an embodiment of the present invention provides a method for transmitting a control channel, which includes:

determining m physical resource blocks and x antenna ports for transmitting a control channel, where any physical resource block among the m physical resource blocks includes n sub-blocks, each sub-block is used for placing a control channel element, m>=1, and n>=1;

using, according to an aggregation level L of the to-be-transmitted control channel, L control channel elements to bear the to-be-transmitted control channel, where L>=1, and L is an integer;

grouping m×n sub-blocks of the m physical resource blocks, and obtaining Q interleave elements, where an interleave element includes L consecutive sub-blocks, Q=floor(m×n/L), floor represents rounding down, and index numbers of the interleave elements are q=0, 1, . . . , Q−1;

performing arrangement and combination on the Q interleave elements and the x antenna ports to obtain Q×x combination elements; and sending the L control channel elements through the combination elements.

In a third aspect, an embodiment of the present invention provides a method for receiving control information, which includes:

obtaining information of m physical resource blocks for transmitting a control channel, where any physical resource block among the m physical resource blocks includes n sub-blocks, any sub-block among the n sub-blocks can be used for placing a control channel element, m>=1, and n>=1;

receiving, according to the information, control channel elements in m×n sub-blocks of the m physical resource blocks;

for an aggregation level $L_K$, determining the number $M_{L_K}$ of corresponding candidate control channels, where L is an integer, K is an integer, and $L_K$ is any one of K aggregation levels;

grouping the m×n sub-blocks of the m physical resource blocks, and obtaining $Q_{L_K}$ interleave elements, where an interleave element includes $L_K$ consecutive sub-blocks, and $Q_{L_K}$=floor(m×n/$L_K$);

performing interleaving on the $Q_{L_K}$ interleave elements;

mapping the $M_{L_K}$ candidate control channels to $M_{L_K}$ interleave elements among the $Q_{L_K}$ interleave elements that are interleaved; and performing detection on the $M_{L_K}$ interleave elements; when a correct control channel is detected, obtaining, through parsing, the to-be-received control information from the correct control channel; when no correct control channel is detected, for another aggregation level among the K aggregation levels, continuing to execute, starting from the determining the number of corresponding candidate control channels, subsequent steps until a correct control channel is detected or all the control channel elements in the m×n sub-blocks are traversed.

In a fourth aspect, an embodiment of the present invention provides a method for transmitting a control channel, which includes:

determining, by a base station, m physical resource blocks for transmitting a control channel, where any physical resource block among the m physical resource blocks includes n sub-blocks, a sub-block among the n sub-blocks can be used for placing a control channel element, m>=1, and n>=1;

setting Q logical candidate elements, where Q=floor(m× n/L), L is an aggregation level of the to-be-transmitted control channel, and floor represents rounding down;

determining, according to the aggregation level L of the to-be-transmitted control channel, the number M of candidate control channels;

determining M logical candidate elements among the Q logical candidate elements, and mapping the Q logical candidate elements to the m physical resource blocks; and sending the to-be-transmitted control channel by placing it in a physical resource to which a logical candidate element is mapped, where the logical candidate element is one of the M logical candidate elements.

In a fifth aspect, an embodiment of the present invention provides a method for receiving control information, which includes:

obtaining information of m physical resource blocks for transmitting a control channel, where any physical resource block among the m physical resource blocks includes n sub-blocks, any sub-block among the n sub-blocks can be used for placing a control channel element, m>=1, and n>=1;

receiving, according to the information, control channel elements in m×n sub-blocks of the m physical resource blocks;

for an aggregation level $L_K$, determining the number $M_{L_K}$ of corresponding candidate control channels, where L is an integer, K is an integer, and $L_K$ is any one of K aggregation levels;

setting $Q_{L_K}$ logical candidate elements, where $Q_{L_K}$=floor (m×n/$L_K$), and floor represents rounding down;

determining $M_{L_K}$ logical candidate elements among the $Q_{L_K}$ logical candidate elements, and mapping the $Q_{L_K}$ logical candidate elements to the m physical resource blocks; and performing detection on physical resources to which the $M_{L_K}$ logical candidate elements are mapped; when a correct control channel is detected, obtaining, through parsing, the to-be-received control information from the correct control channel; when no correct control channel is detected, for another aggregation level among the K aggregation levels, continuing to execute, starting from the determining the number of corresponding candidate control channels, subsequent steps until a correct control channel is detected or all the control channel elements in the m×n sub-blocks are traversed.

In a sixth aspect, an embodiment of the present invention provides a method for transmitting a control channel, which includes:

determining m physical resource blocks for transmitting a control channel, where any physical resource block among the m physical resource blocks includes n sub-blocks, every c sub-blocks among m×n sub-blocks of the m physical resource blocks are a sub-block group, the sub-block group can be used for placing a control channel element, m>=1, n>=1, and c>=1;

setting Q logical candidate elements, where Q=floor(C/ L), C=floor(m×n/c) is the number of sub-block groups in the m physical resource blocks, L is an aggregation level of the to-be-transmitted control channel, and floor represents rounding down;

determining, according to the aggregation level L of the to-be-transmitted control channel, the number M of candidate control channels, and grouping the m×n sub-blocks in the m physical resource blocks to obtain Q sub-blocks;

determining M logical candidate elements among the Q logical candidate elements;

performing interleaving on the Q logical candidate elements, and mapping the Q interleaved logical candidate elements to the Q sub-blocks; and sending the to-be-transmitted control channel by placing it in a sub-block to which a logical candidate element is mapped, where the logical candidate element is one of the M logical candidate elements.

In a seventh aspect, an embodiment of the present invention provides a method for receiving a control channel, which includes:

obtaining information of m physical resource blocks for transmitting a control channel, where any physical resource block among the m physical resource blocks includes n sub-blocks, every c sub-blocks among m×n sub-blocks of the m physical resource blocks are a sub-block group, the sub-block group can be used for placing a control channel element, $m>=1$, $n>=1$, and $c>=1$;

receiving, according to the information, control channel elements in the m×n sub-blocks of the m physical resource blocks;

for an aggregation level $L_K$, setting $Q_{L_K}$ logical candidate elements, where $Q_{L_K}=floor(C/L_K)$, $C=floor(m\times n/c)$ is the number of sub-block groups in the m physical resource blocks, $L_K$ is any one of K aggregation levels, and floor represents rounding down;

determining, according to the aggregation level $L_K$ of the to-be-transmitted control channel, the number $M_{L_K}$ of candidate control channels, and grouping the m×n sub-blocks in the m physical resource blocks to obtain $Q_{L_K}$ sub-blocks;

determining $M_{L_K}$ logical candidate elements among the $Q_{L_K}$ logical candidate elements;

performing interleaving on the $Q_{L_K}$ logical candidate elements, and mapping the $Q_{L_K}$ interleaved logical candidate elements to the $Q_{L_K}$ sub-blocks; and performing detection on $M_{L_K}$ sub-blocks to which the $M_{L_K}$ logical candidate elements are mapped; when a correct control channel is detected, obtaining, through parsing, the to-be-received control information from the correct control channel; when no correct control channel is detected, for another aggregation level among the K aggregation levels, continuing to execute, starting from the determining the number of corresponding candidate control channels, subsequent steps until a correct control channel is detected or all the control channel elements in the m×n sub-blocks are traversed.

In an eighth aspect, an embodiment of the present invention provides a base station, which includes:

a resource configuration module, configured to determine m physical resource blocks for transmitting a control channel, where any physical resource block among the m physical resource blocks includes n sub-blocks, every c sub-blocks among m×n sub-blocks of the m physical resource blocks are a sub-block group, the sub-block group can be used for placing a control channel element, $m>=1$, $n>=1$, and $c>=1$;

a logical setting module, configured to set Q logical candidate elements, where $Q=floor(C/L)$, $C=floor(m\times n/c)$ is the number of sub-block groups in the m physical resource blocks, L is an aggregation level of the to-be-transmitted control channel, and floor represents rounding down;

a resource grouping module, configured to determine, according to the aggregation level L of the to-be-transmitted control channel, the number M of candidate control channels, and group the m×n sub-blocks in the m physical resource blocks to obtain Q sub-blocks;

a candidate determining module, configured to determine M logical candidate elements among the Q logical candidate elements;

a mapping module, configured to perform interleaving on the Q logical candidate elements, and map the Q interleaved logical candidate elements to the Q sub-blocks; and a channel sending module, configured to send the to-be-transmitted control channel by placing it in a sub-block to which a logical candidate element is mapped, where the logical candidate element is one of the M logical candidate elements.

In a ninth aspect, an embodiment of the present invention provides a user equipment for receiving a control channel, which includes:

a resource information obtaining module, configured to obtain information of m physical resource blocks for transmitting a control channel, where any physical resource block among the m physical resource blocks includes n sub-blocks, every c sub-blocks among m×n sub-blocks of the m physical resource blocks are a sub-block group, the sub-block group can be used for placing a control channel element, $m>=1$, $n>=1$, and $c>=1$;

a channel element receiving module, configured to receive, according to the information, control channel elements in the m×n sub-blocks of the m physical resource blocks;

a logical setting module, configured to, for an aggregation level $L_K$, set $Q_{L_K}$ logical candidate elements, where $Q_{L_K}=floor(C/L_K)$, $C=floor(m\times n/c)$ is the number of sub-block groups in the m physical resource blocks, $L_K$ is any one of K aggregation levels, and floor represents rounding down;

a resource grouping module, configured to determine, according to the aggregation level L of the to-be-transmitted control channel, the number $M_{L_K}$ of candidate control channels, and group the m×n sub-blocks in the m physical resource blocks to obtain $Q_{L_K}$ sub-blocks;

a candidate determining module, configured to determine $M_{L_K}$ logical candidate elements among the $Q_{L_K}$ logical candidate elements;

a mapping module, configured to perform interleaving on the $Q_{L_K}$ logical candidate elements, and map the $Q_{L_K}$ interleaved logical candidate elements to the $Q_{L_K}$ sub-blocks; and a control channel detecting module, configured to perform detection on control channel elements placed in $M_{L_K}$ sub-blocks to which the $M_{L_K}$ logical candidate elements are mapped; when a correct control channel is detected, obtain, through parsing, the to-be-received control information from the correct control channel; when no correct control channel is detected, for another aggregation level among the K aggregation levels, continue to execute, starting from the determining the number of corresponding candidate control channels, subsequent steps until a correct control channel is detected or all the control channel elements in the m×n sub-blocks are traversed.

A technical effect of the method, base station, and user equipment for transmitting a control channel according to the embodiments of the present invention is: grouping is performed, according to an aggregation level of the to-be-transmitted control channel, on sub-blocks in physical resource blocks configured by a base station for the to-be-transmitted control channel, then interleaving is performed, and then candidate control channels are mapped to the interleaved sub-blocks, so that any candidate control channel of the to-be-transmitted control channel is sent on consecutive time-frequency resources as possible, and meanwhile different candidate control channels are on different PRB pairs as possible. In this way, the base station may have better flexibility during actual sending of the ePDCCH, thereby not only achieving a precoding gain and facilitating better transmission of control information, but also achieving a larger scheduling gain.

DETAILED DESCRIPTION

Embodiments of the present invention are mainly applied to transmission of a centralized/localized ePDCCH.

Figure 1:
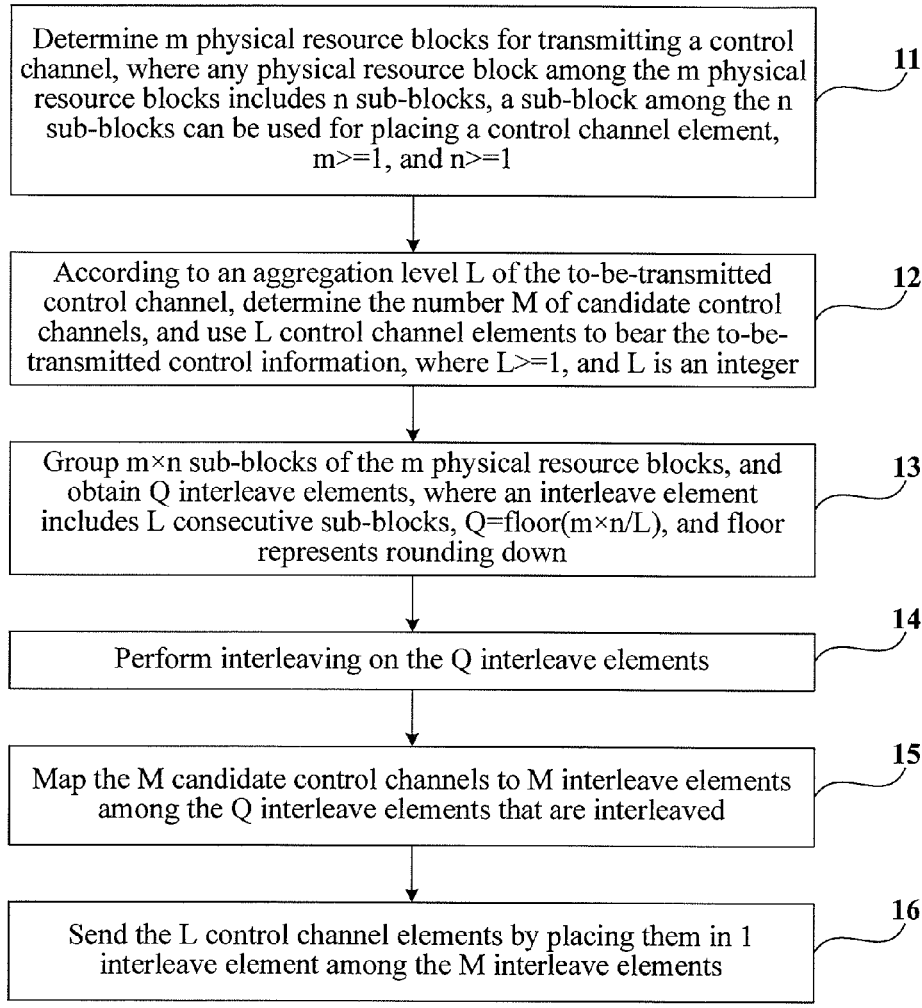
FIG. 1 is a flowchart of a method for transmitting a control channel according to an embodiment of the present invention.

FIG. 1 is a flowchart of a method for transmitting a control channel according to an embodiment of the present invention. The method provided in this embodiment is executed by a base station side, and as shown in FIG. 1, specifically includes:

Operation 11: Determine m physical resource blocks for transmitting a control channel, where any physical resource block among the m physical resource blocks includes n sub-blocks, a sub-block among the n sub-blocks can be used for placing a control channel element, $m>=1$, and $n>=1$.

Operation 12: Determine, according to an aggregation level L of the to-be-transmitted control channel, the number M of candidate control channels, and use L control channel elements to bear the to-be-transmitted control information, where $L>=1$, and L is an integer.

Candidate control channels corresponding to aggregation levels may be as shown in the following table.

| Space search type | Aggregation level L | Search space size [eCCEs] | Number $M^{(L)}$ of candidate ePDCCHs (candidate) |
|---|---|---|---|
| UE-specific (UE-specific) | 1 | 6 | 6 |
| | 2 | 12 | 6 |
| | 4 | 8 | 2 |
| | 8 | 16 | 2 |
| Common (Common) | 4 | 16 | 4 |
| | 8 | 16 | 2 |

Operation 13: Group m×n sub-blocks of the m physical resource blocks, and obtain Q interleave elements, where an interleave element includes L consecutive sub-blocks, $Q=\text{floor}(m \times n/L)$, and floor represents rounding down.

Operation 14: Perform interleaving on the Q interleave elements.

Operation 15: Map the M candidate control channels to M interleave elements among the Q interleave elements that are interleaved.

Operation 16: Send the L control channel elements by placing them in 1 interleave element among the M interleave elements.

The performing interleaving on the Q interleave elements includes:

setting index numbers of the interleave elements to be $q=I, I+1, \ldots, I+Q-1$, and with the index numbers q starting from I, performing arrangement sequentially from top to bottom and from left to right, to obtain a P×m interleave matrix with a size being Q, where P is the number of rows and equal to floor(n/L), and I is an integer;

or, with the index numbers q starting from I, performing arrangement sequentially from left to right and from top to bottom, to obtain an m×P interleave matrix with a size being Q, where P is the number of columns and equal to floor(n/L), and I is an integer.

After obtaining the P×m interleave matrix with the size being Q, the process of performing interleaving on the Q interleave elements further includes:

dividing the P×m interleave matrix into two parts according to columns; if m is an even number, interchanging a $(2i)^{th}$ column and a $(2i+m/2)^{th}$ column of the P×m interleave matrix, where i is an integer, and $2<=2i<=m/2$; or, interchanging a $(2i+1)^{th}$ column and a $(2i+m/2+1)^{th}$ column of the P×m interleave matrix, where $1<=2i+1<=m/2$, so as to obtain a first interleave matrix; and if m is an odd number, interchanging a $(2j)^{th}$ column and a $(2j+floor(m/2))^{th}$ column of the P×m interleave matrix, where j is an integer, and $2<=2j<m/2$; or, interchanging a $(2j+1)^{th}$ column and a $(2j+floor(m/2)+1)^{th}$ column of the P×m interleave matrix, where $1<=2j+1<m/2$, so as to obtain a second interleave matrix;

or, if m is an odd number, interchanging a $(2j)^{th}$ column and a $(2j+floor(m/2))^{th}$ column of the P×m interleave matrix, where $2<=2j<=floor(m/2)+1$; or, interchanging a $(2j+1)^{th}$ column and a $(2j+floor(m/2)+1)^{th}$ column of the P×m interleave matrix, where $1<2j+1<=floor(m/2)+1$, so as to obtain a second interleave matrix;

or, if m is an odd number, interchanging a $(2j)^{th}$ column and a $(2j+floor(m/2)+1)^{th}$ column of the P×m interleave matrix, where $2<=2j<m/2$; or, interchanging a $(2j+1)^{th}$ column and a $(2j+1+floor(m/2)+1)^{th}$ column of the P×m interleave matrix, where $1<=2j+1<m/2$, so as to obtain a second interleave matrix.

The mapping to M interleave elements among the Q interleave elements that are interleaved includes:

determining, according to a terminal-specific parameter, a start position of the M candidate control channels, where the start position is a specific interleave element in the P×m interleave matrix; and mapping the M candidate control channels to the M interleave elements in the P×m interleave matrix, where the M interleave elements start from the specific interleave element and are arranged in order from left to right and from top to bottom.

Or, the mapping to M interleave elements among the Q interleave elements that are interleaved includes:

determining, according to a terminal-specific parameter, a start position of the M candidate control channels, where the start position is a specific interleave element in the P×m interleave matrix; and mapping the M candidate control channels to the M interleave elements in the P×m interleave matrix, where the M interleave elements start from the specific interleave element and are arranged according to positions obtained through increasing row and column positions of the specific interleave element in the P×m interleave matrix by 1 each time and performing a modulo operation.

The mapping to M interleave elements among the Q interleave elements that are interleaved includes:

determining, according to a terminal-specific parameter, a start position of the M candidate control channels, where the start position is a specific interleave element in the first interleave matrix or the second interleave matrix; and mapping the M candidate control channels to the M interleave elements in the first interleave matrix or the second interleave matrix, where the M interleave elements start from the specific interleave element and are arranged in order from left to right and from top to bottom.

Figure 2:
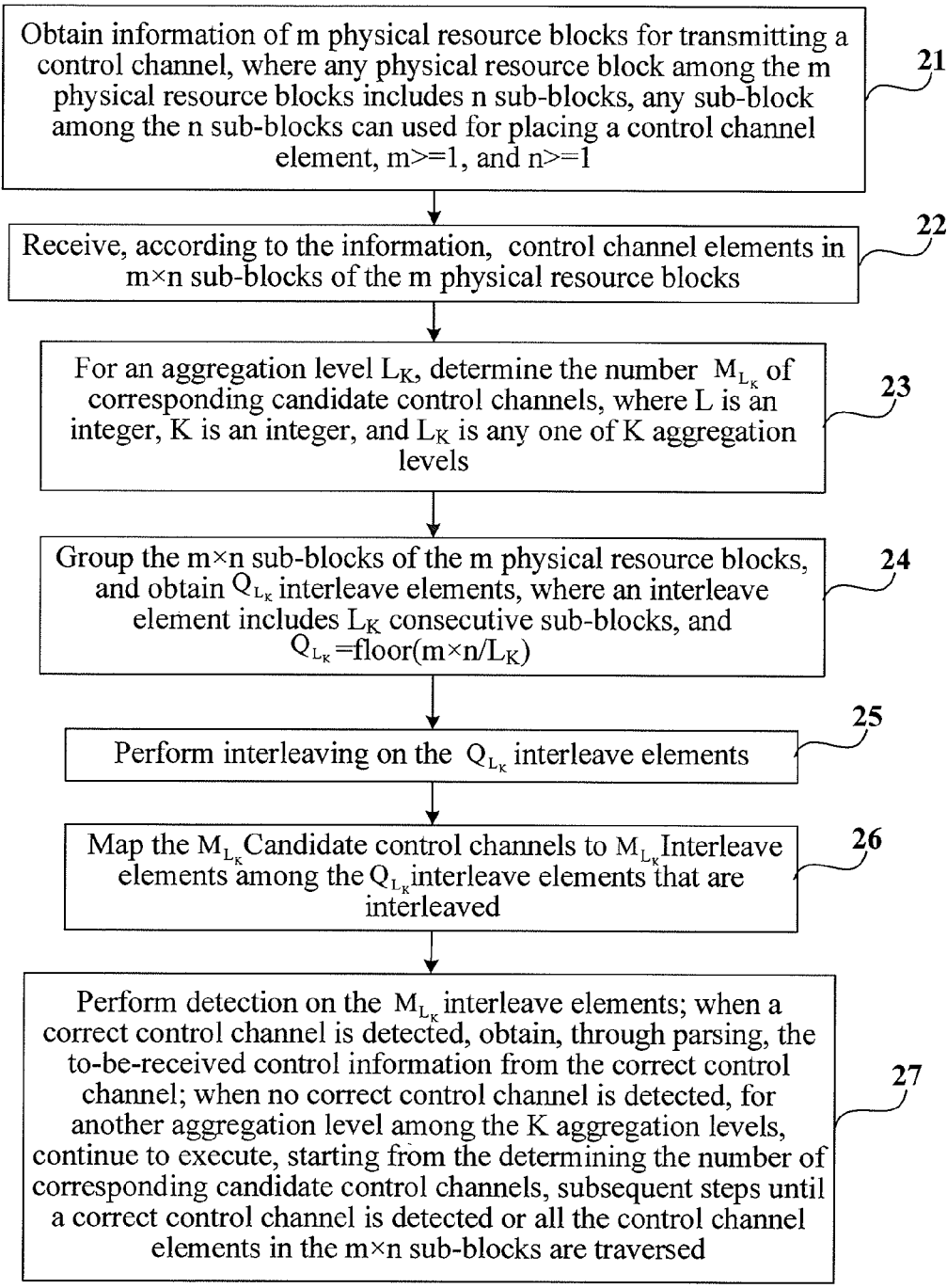
FIG. 2 is a flowchart of a method for receiving control information according to an embodiment of the present invention.

FIG. 2 is a flowchart of a method for receiving control information according to an embodiment of the present invention. The method provided in this embodiment is executed by a user equipment side, and as shown in FIG. 2, specifically includes:

Operation 21: Obtain information of m physical resource blocks for transmitting a control channel, where any physical resource block among the m physical resource blocks includes n sub-blocks, any sub-block among the n sub-blocks can be used for placing a control channel element, $m>=1$, and $n>=1$.

Operation 22: Receive, according to the information, control channel elements in m×n sub-blocks of the m physical resource blocks.

Operation 23: For an aggregation level $L_K$, determine the number $M_{L_K}$ of corresponding candidate control channels, where for $M_{L_K}$ is an integer, K is an integer, and $L_K$ is any one of K aggregation levels.

The number of candidate control channels is the maximum number of times that the user equipment detects, corresponding to an aggregation level of a downlink physical control channel, the control channel.

Operation 24: Group the m×n sub-blocks of the m physical resource blocks, and obtain $Q_{L_K}$ interleave elements, where an interleave element includes $L_K$ consecutive sub-blocks, and $Q_{L_K}=floor(m\times n/L_K)$.

Operation 25: Perform interleaving on the $Q_{L_K}$ interleave elements.

Operation 26: Map the $M_{L_K}$ candidate control channels to $M_{L_K}$ interleave elements among the $Q_{L_K}$ interleave elements that are interleaved.

Operation 27: Perform detection on the $M_{L_K}$ interleave elements; when a correct control channel is detected, obtain, through parsing, the to-be-received control information from the correct control channel; when no correct control channel is detected, for another aggregation level among the K aggregation levels, continue to execute, starting from the determining the number of corresponding candidate control channels, subsequent steps until a correct control channel is detected or all the control channel elements in the m×n sub-blocks are traversed.

In the foregoing operation 25, the performing interleaving on the $Q_{L_K}$ interleave elements may include:

setting index numbers of the interleave elements to be $q=I, I+1, \ldots, I+Q_{L_K}-1$, and with the index numbers q starting from 0, performing arrangement sequentially from top to bottom and from left to right, to obtain a P×m interleave matrix with a size being $Q_{L_K}$, where P is the number of rows and equal to $floor(n/L_K)$, and I is an integer;

or, with the index numbers q starting from I, performing arrangement sequentially from left to right and from top to bottom, to obtain an m×P interleave matrix with a size being $Q_{L_K}$, where P is the number of columns and equal to $floor(n/L_K)$.

After obtaining the P×m interleave matrix with the size being $Q_{L_K}$, the process of performing interleaving on the $Q_{L_K}$ interleave elements further includes:

dividing the P×m interleave matrix into two parts according to columns; if m is an even number, interchanging a $(2i)^{th}$ column and a $(2i+m/2)^{th}$ column of the P×m interleave matrix, where i is an integer, and $2<=2i<=m/2$; or, interchanging a $(2i+1)^{th}$ column and a $(2i+m/2+1)^{th}$ column, where $1<=2i+1<=m/2$, so as to obtain a first interleave matrix; and if m is an odd number, interchanging a $(2j)^{th}$ column and a $(2j+floor(m/2))^{th}$ column of the P×m interleave matrix, where j is an integer and $2<=2j<m/2$; or, interchanging a $(2j+1)^{th}$ column and a $(2j+floor(m/2)+1)^{th}$ column of the P×m interleave matrix, where $1<=2j+1<m/2$, so as to obtain a second interleave matrix;

or, if m is an odd number, interchanging a $(2j)^{th}$ column and a $(2j+floor(m/2))^{th}$ column of the P×m interleave matrix, where $2<=2j<=floor(m/2)+1$; or, interchanging a $(2j+1)^{th}$ column and a $(2j+floor(m/2)+1)^{th}$ column of the P×m interleave matrix, where $1<2j+1<=floor(m/2)+1$, so as to obtain a second interleave matrix;

or, if m is an odd number, interchanging a $(2j)^{th}$ column and a $(2j+floor(m/2)+1)^{th}$ column of the P×m interleave matrix, where $2<=2j<m/2$; or, interchanging a $(2j+1)^{th}$ column and a $(2j+1+floor(m/2)+1)^{th}$ column of the P×m interleave matrix, where $1<=2j+1<m/2$, so as to obtain a second interleave matrix.

The mapping to $M_{L_K}$ interleave elements among the $Q_{L_K}$ interleave elements that are interleaved includes:

determining, according to a terminal-specific parameter, a start position of the $M_{L_K}$ candidate control channels, where the start position is a specific interleave element in the P×m interleave matrix; and mapping the $M_{L_K}$ candidate control channels to the $M_{L_K}$ interleave elements in the P×m interleave matrix, where the interleave elements start from the specific interleave element and are arranged in order from left to right and from top to bottom.

Or, the mapping to $M_{L_K}$ interleave elements among the $Q_{L_K}$ interleave elements that are interleaved includes:

determining, according to a terminal-specific parameter, a start position of the $M_{L_K}$ candidate control channels, where the start position is a specific interleave element in the P×m interleave matrix; and mapping the $M_{L_K}$ candidate control channels to the $M_{L_K}$ interleave elements in the P×m interleave matrix, where the $M_{L_K}$ interleave elements start from the specific interleave element and are arranged according to positions obtained through increasing row and column positions of the specific interleave element in the P×m interleave matrix by 1 each time and performing a modulo operation.

Or, the mapping to $M_{L_K}$ interleave elements among the $Q_{L_K}$ interleave elements that are interleaved includes:

determining, according to a terminal-specific parameter, a start position of the $M_{L_K}$ candidate control channels, where the start position is a specific interleave element in the first interleave matrix or the second interleave matrix; and mapping the $M_{L_K}$ candidate control channels to the $M_{L_K}$ interleave elements in the first interleave matrix or the second interleave matrix, where the $M_{L_K}$ interleave elements start from the specific interleave element and are arranged in order from left to right and from top to bottom.

The foregoing method for transmitting a control channel is further illustrated below in detail through Embodiment 1 to Embodiment 4.

Embodiment 1

FIG. 3A to FIG. 3E are a configuration schematic diagram of a physical resource in a method for transmitting a control channel according to Embodiment 1 of the present invention.

In this embodiment, a base station needs to send an ePDCCH with an aggregation level being 1 to a certain UE.

Figure 3A:
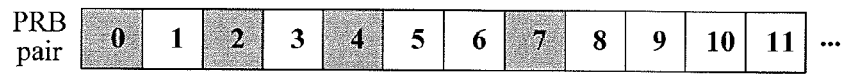
FIG. 3A to FIG. 3F are schematic configuration diagrams of a physical resource in a method for transmitting a control channel according to Embodiment 1 of the present invention.

As shown in FIG. 3A, the base station configures 4 PRB pairs for the to-be-sent ePDCCH: a PRB pair 0, a PRB pair 2, a PRB pair 4, and a PRB pair 7, so that the UE performs blind detection in the 4 PRB pairs, and receives the correct control channel ePDCCH.

Each PRB pair includes 4 sub-blocks, the 4 PRB pairs have a total of 16 sub-blocks, and each sub-block is capable of placing 1 eCCE.

After the 4 PRB pairs are arranged in order of the PRB pair 0, the PRB pair 2, the PRB pair 4, and the PRB pair 7, as shown in FIG. 3B to FIG. 3E, the 16 sub-blocks are numbered as 0, 1, 2, . . . , 15 in order.

According to the aggregation level of the to-be-transmitted ePDCCH, the sub-blocks 0, 1, 2, . . . , 15 are grouped, to obtain Q interleave elements.

Figure 3B:
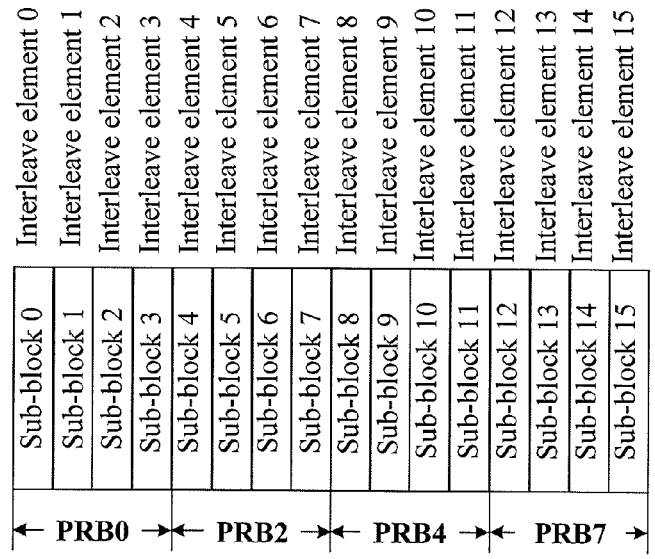

For an aggregation level 1, as shown in FIG. 3B, a sub-block is 1 interleave element, and 4 PRB pairs are divided into 16 interleave elements. Since 1 sub-block is 1 interleave element, for ease of description, numbers of the interleave elements herein are the same as numbers 0, 1, 2, . . . , 15 of the sub-blocks.

Figure 3C:
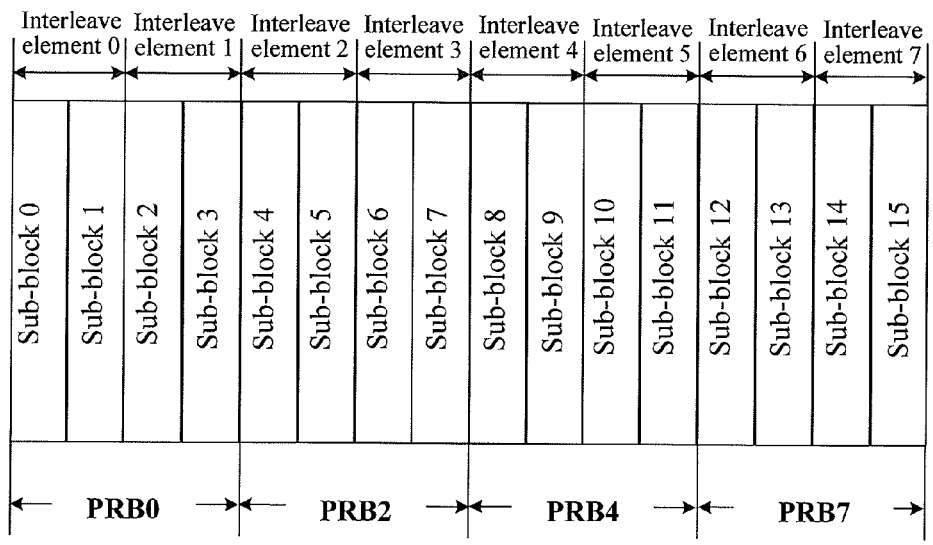

For an aggregation level 2, as shown in FIG. 3C, two adjacent sub-blocks are 1 interleave element, and 4 PRB pairs are divided into 8 interleave elements 0, 1, 2, . . . , 7.

Figure 3D:
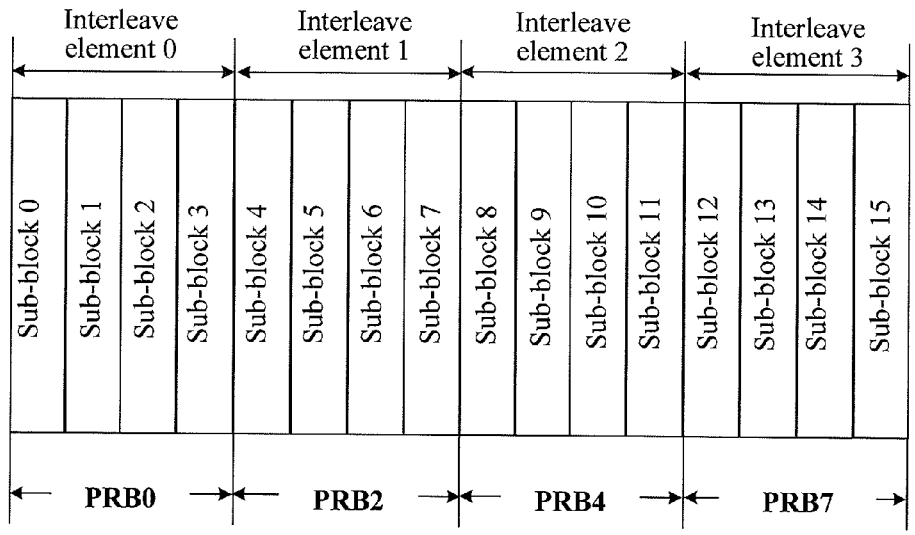

For an aggregation level 4, as shown in FIG. 3D, 4 consecutive sub-blocks are 1 interleave element, and 4 PRB pairs are divided into 4 interleave elements 0, 1, 2, and 3.

Figure 3E:
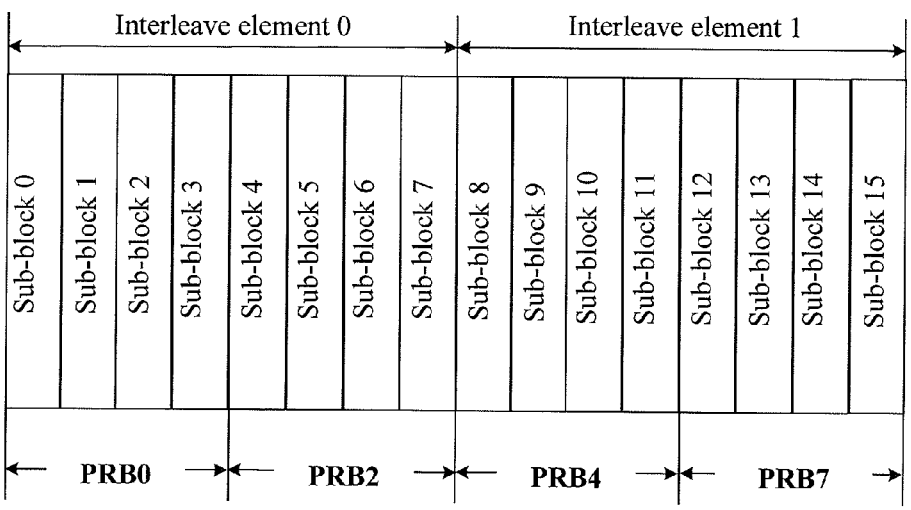
Figure 8:
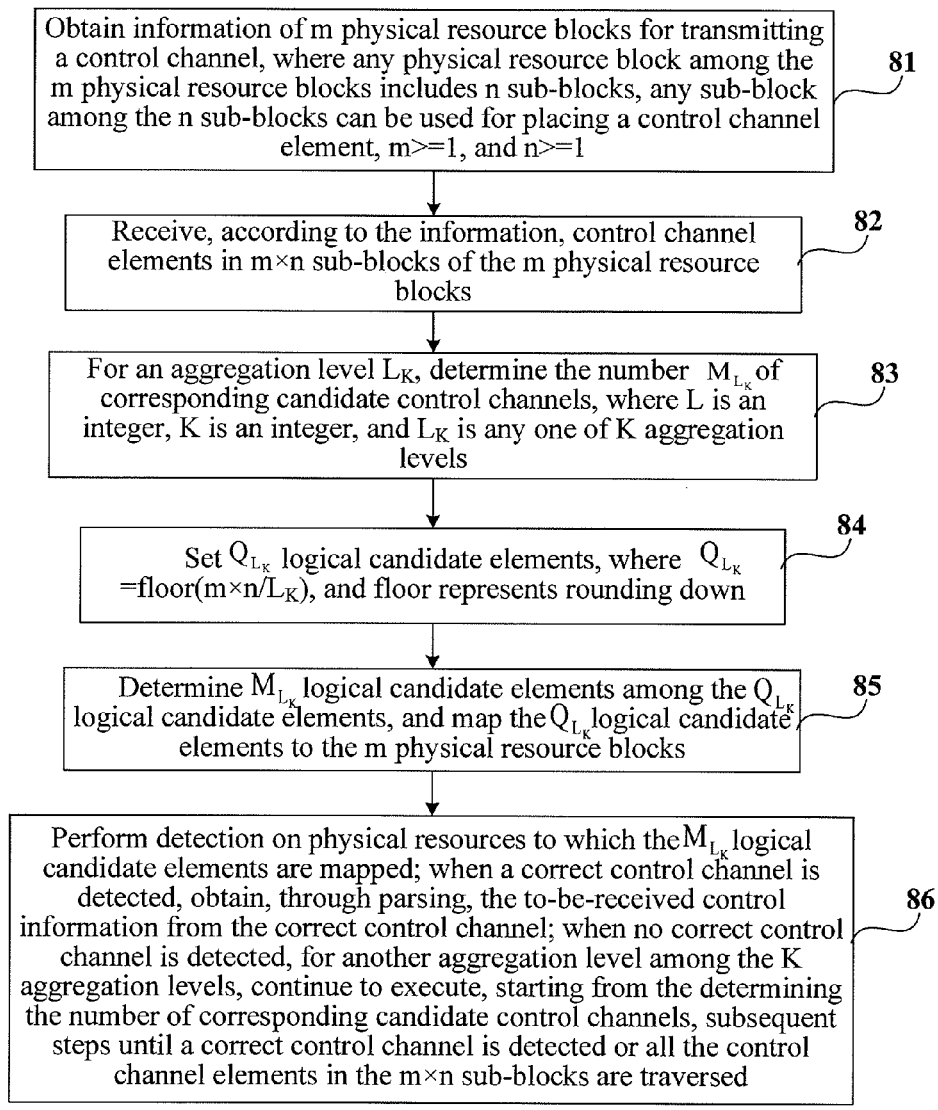
FIG. 8 is a flowchart of another method for receiving control information according to an embodiment of the present invention.

For an aggregation level 8, as shown in FIG. 3E, 8 consecutive sub-blocks are 1 interleave element, and 4 PRB pairs are divided into 2 interleave elements 0 and 1.

In this embodiment, the aggregation level is 1, so that interleaving is performed on the 16 interleave elements 0, 1, 2, . . . , 15.

Specifically, the 16 interleave elements starting from 0 are arranged sequentially from top to bottom and from left to right, to obtain a 4×4 interleave matrix with the size being 16, that is to say, the 16 interleave elements are written into the interleave matrix according to columns:

| 0 | 4 | 8  | 12 |
|---|---|----|----|
| 1 | 5 | 9  | 13 |
| 2 | 6 | 10 | 14 |
| 3 | 7 | 11 | 15 |

The 4×4 interleave matrix is divided into two halves, namely, a first half and a second half. If n is an even number, a $(2i(2i<=n/2))^{th}$ column (or a $(2i+1)^{th}$ column) and a $(2i+n/2(2i+1+n/2))^{th}$ column are interchanged. If n is an odd number, a $(2i(2i<floor(n/2)))^{th}$ column (or a $(2i+1)^{th}$ column) and a $(2i+floor(n/2)(2i+1+n/2))^{th}$ column are interchanged.

In this embodiment, n is 4, and after interchanging is performed according to the foregoing method, a new interleave matrix is obtained:

| 0 | 12 | 8  | 4 |
|---|----|----|---|
| 1 | 13 | 9  | 5 |
| 2 | 14 | 10 | 6 |
| 3 | 15 | 11 | 7 |

In addition, the base station further obtains, according to the aggregation level 1 of the to-be-transmitted ePDCCH, that the number of candidate ePDCCHs is 6.

Figure 3F:
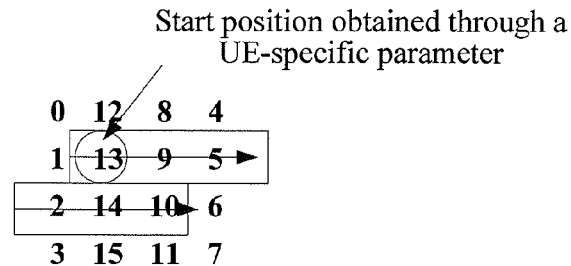

Then, as shown in FIG. 3F, the base station obtains, through a UE-specific (UE specific) parameter, that a start position of the 6 candidate ePDCCHs in the new interleave matrix is 13, that is, the second sub-block in the PRB pair 7. Six interleave elements 13, 9, 5, 2, 14, and 10 starting from the start position are used as physical resources of the 6 candidate ePDCCHs. The 6 interleave elements 9, 5, 2, 14, and 10 correspond to the second sub-block in the PRB pair 4, the second sub-block in the PRB pair 2, the third sub-block in the PRB pair 0, the third sub-block in the PRB pair 7, and the third sub-block in the PRB pair 4 respectively.

Finally, the base station sends the to-be-transmitted ePDCCH by placing it in any sub-block among the sub-blocks 13, 9, 5, 2, 14, and 10.

Correspondingly, when the UE side receives the control channel, the UE first obtains search space information of the to-be-received ePDCCH: the PRB pair 0, the PRB pair 2, the PRB pair 4, and the PRB pair 7. The UE may obtain the search space information from information sent by the base station.

The UE does not know the aggregation level of the to-be-received ePDCCH, so that for all predefined aggregation levels, such as 1, 2, 4, and 8, the UE adopts the same interleaving method as the base station, then maps the candidate ePDCCHs to an interleave element that is interleaved, and detects an ePDCCH placed in the interleave element that is mapped to. The interleaving method and the mapping method of the base station side may be solidified in the UE.

If for the aggregation level 8, the UE cannot detect the correct ePDCCH by adopting the foregoing method, the UE continues to perform searching for an aggregation level among the aggregation levels 1, 2, and 4 according to the foregoing method in this embodiment.

If for the aggregation level 1, the UE detects the correct ePDCCH by adopting the foregoing method in this embodiment, the UE obtains, through parsing, control information from the ePDCCH, and stops receiving the control channel, so as not to search the search space again for cases of the rest aggregation levels 2 and 4.

In this embodiment, the UE detects the correct control channel in the second sub-block in the PRB pair 4, the second sub-block in the PRB pair 2, the third sub-block in the PRB pair 0, the third sub-block in the PRB pair 7, and the third sub-block in the PRB pair 4.

Embodiment 2

Figure 4A:
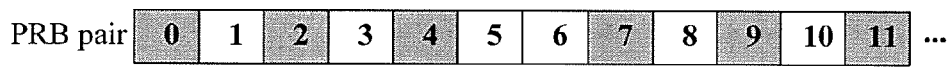
FIG. 4A to FIG. 4C are schematic configuration diagrams of a physical resource in a method for transmitting a control channel according to Embodiment 2 of the present invention.
Figure 4B:
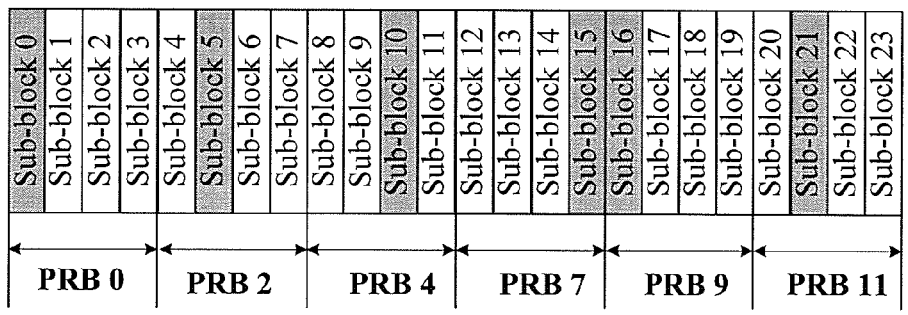
Figure 4C:
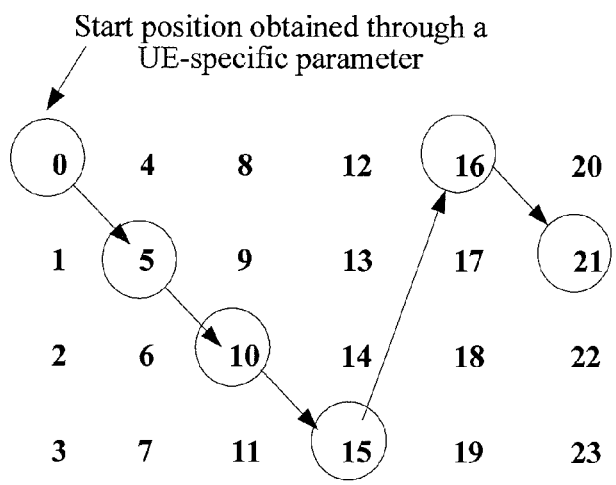

FIG. 4A to FIG. 4C are schematic configuration diagrams of a physical resource in a method for transmitting a control channel according to Embodiment 2 of the present invention.

In this embodiment, a base station needs to send an ePDCCH with an aggregation level being 1 to a certain UE.

The base station may obtain, according to the aggregation level 1 of the to-be-transmitted ePDCCH, that the number of candidate ePDCCHs is 6.

In addition, as shown in FIG. 4A, the base station configures 6 PRB pairs for the to-be-sent ePDCCH: a PRB pair 0, a PRB pair 2, a PRB pair 4, a PRB pair 7, a PRB pair 9, and a PRB pair 11, so that the UE performs blind detection in the 6 PRB pairs, and receives the correct control channel ePDCCH.

Similar to that in Embodiment 1, each PRB pair includes 4 sub-blocks, the 4 PRB pairs have a total of 16 sub-blocks, and each sub-block is capable of placing 1 eCCE.

After the 6 PRB pairs are arranged in order of the PRB pair 0, the PRB pair 2, the PRB pair 4, the PRB pair 7, the PRB pair 9, and the PRB pair 11, as shown in FIG. 4B, the 24 sub-blocks are numbered as 0, 1, 2, . . . , 23 in order.

Similar to that in Embodiment 1, after interleaving is performed on the 24 sub-blocks, an interleave matrix is obtained:

```
0  4   8  12  16  20
1  5   9  13  17  21
2  6  10  14  18  22
3  7  11  15  19  23
```

According to a UE-specific parameter, it is determined that the 6 candidate ePDCCHs are mapped to 6 sub-blocks among the 24 sub-blocks. As shown in FIG. 4C, a start position, that is, a sub-block 0, for placing the 6 candidate ePDCCHs is obtained through the UE-specific parameter. Then, row and column positions of the sub-block 0 in the interleave matrix are increased by 1 each time, and a modulo operation is performed for the number of rows and the number of columns respectively, to obtain row and column positions of a next sub-block for placing the 6 candidate ePDCCHs, so as to obtain a corresponding sub-block 5; similarly, other sub-blocks 10, 15, 16, and 21 for placing the 6 candidate ePDCCHs are obtained sequentially.

Specifically, as shown in FIG. 4B, the 6 candidate ePDCCHs are mapped to the sub-blocks 0, 5, 10, 15, 16, and 21 among the 24 sub-blocks, which are a first sub-block in the PRB pair 0, a second sub-block in the PRB pair 2, a third sub-block in the PRB pair 4, a fourth sub-block in the PRB pair 7, a first sub-block in the PRB pair 9, and a second sub-block in the PRB pair 11 respectively.

Finally, the to-be-transmitted ePDCCH is placed in a sub-block among the 6 sub-blocks that are mapped to for sending. In other words, one of the 6 candidate ePDCCHs is used to bear to-be-transmitted control information, and finally, the ePDCCH that bears the control information, that is, the to-be-transmitted ePDCCH, is placed in a sub-block among the 6 sub-blocks that are mapped to for sending.

A method for a UE to receive the control channel is substantially the same as that in Embodiment 1, and a difference lies in that an interleaving method and a mapping method adopted by the UE side are methods adopted by the base station in this Embodiment 2.

In this embodiment, the UE detects, by traversing aggregation levels, the correct ePDCCH in the first sub-block in the PRB pair 0, the second sub-block in the PRB pair 2, the third sub-block in the PRB pair 4, the fourth sub-block in the PRB pair 7, the first sub-block in the PRB pair 9, or the second sub-block in the PRB pair 11.

Embodiment 3

This embodiment is substantially the same as Embodiment 2, and a difference lies in a manner of mapping candidate ePDCCHs to physical resources.

Figure 5:
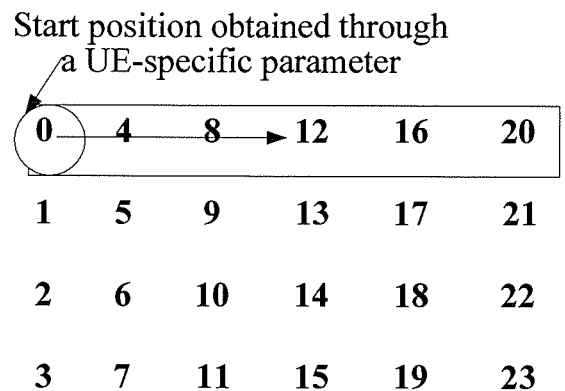
FIG. 5 is a schematic configuration diagram of a physical resource in a method for transmitting a control channel according to Embodiment 3 of the present invention.

As shown in FIG. 5, a start position, that is, a sub-block 0, for placing 6 candidate ePDCCHs is obtained through a UE-specific parameter. Subsequent 5 sub-blocks 4, 8, 12, 16, and 20 in a row where the sub-block 0 is located are also used as physical resources for placing the 6 candidate ePDCCHs, which correspond to a first sub-block of a PRB pair 0, a first sub-block of a PRB pair 2, a first sub-block of a PRB pair 4, a first sub-block of a PRB pair 7, a first sub-block of a PRB pair 9, and a first sub-block of a PRB pair 11 respectively.

It is assumed that the foregoing are resources configured to send an ePDCCH to a UE1. It can be seen that, the 6 candidate ePDCCHs are configured in different PRB pairs, and in this way, for another user UE2, if an ePDCCH of the same aggregation level needs to be sent, a base station may configure sub-blocks deviating from the resources of the UE1 in the different PRB pairs. For example, for the UE2, the base station uses the second sub-blocks on all PRB pairs 0, 2, 4, 7, 9, and 11 to send a candidate ePDCCH. If the base station also configures the PRB pair 0 as a PRB pair for the UE2 for transmitting the ePDCCH, when the base station sends an ePDCCH with the aggregation level being 1 on the PRB pair 0 for the UE2, the second sub-block is occupied, which does not conflict with the physical resources occupied by the UE1.

A method for a UE to receive the control channel is substantially the same as that in Embodiment 1, and a difference lies in that an interleaving method and a mapping method adopted by the UE side are methods adopted by the base station in this Embodiment 3.

In this embodiment, the UE detects, by traversing aggregation levels, the correct ePDCCH in the first sub-block in the PRB pair 0, the first sub-block in the PRB pair 2, the first sub-block in the PRB pair 4, the first sub-block in the PRB pair 7, the first sub-block in the PRB pair 9, or the first sub-block in the PRB pair 11.

Embodiment 4

Figure 6:
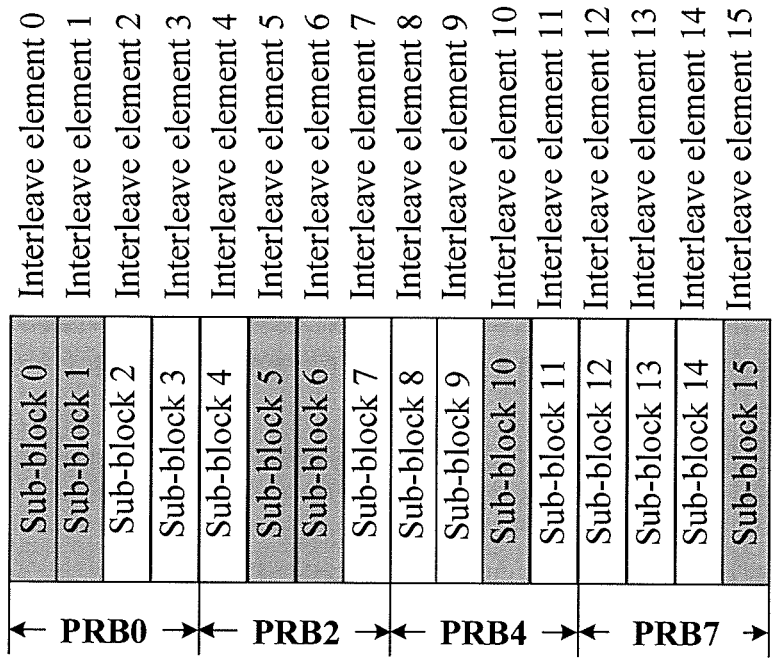
FIG. 6 is a schematic configuration diagram of a physical resource in a method for transmitting a control channel according to Embodiment 4 of the present invention.

FIG. 6 is a schematic configuration diagram of a physical resource in a method for transmitting a control channel according to Embodiment 4 of the present invention.

This embodiment is substantially the same as Embodiment 1, and a difference lies in a manner of mapping candidate ePDCCHs to physical resources.

As shown in FIG. 6, 6 candidate ePDCCHs are mapped to a first sub-block in a PRB pair 0, a second sub-block in the PRB pair 0, a second sub-block in a PRB pair 2, a third sub-block in the PRB pair 2, a third sub-block in a PRB pair 4, and a fourth sub-block in a PRB pair 7 respectively.

The above embodiment is for a case that physical resources occupied by a candidate ePDCCH do not exceed one PRB pair, and an integer number of candidate ePDCCHs may be placed in one PRB pair. For a certain aggregation level, when physical resources occupied by a candidate ePDCCH exceed one PRB pair, for example, an aggregation level 8, the candidate ePDCCH needs to occupy two PRB pairs, the number of rows or the number of columns of an interleave matrix is 1, and other operations remain unchanged.

A method for a UE to receive the control channel is substantially the same as that in Embodiment 1, and a difference lies in that an interleaving method and a mapping method adopted by the UE side are methods adopted by the base station in this Embodiment 4.

In this embodiment, the UE detects, by traversing aggregation levels, the correct ePDCCH in the first sub-block in the PRB pair 0, the second sub-block in the PRB pair 0, the second sub-block in the PRB pair 2, the third sub-block in the PRB pair 2, the third sub-block in the PRB pair 4, or the fourth sub-block in the PRB pair 7.

Embodiment 5

This embodiment is for a case that for a certain aggregation level, an integer number of candidate ePDCCHs cannot be placed in one PRB pair. Operations are substantially the same as those in the above embodiment, and a difference lies in that, when an integer number of ePDCCHs cannot be placed in physical resources of occupied PRB pairs of a search space of to-be-transmitted ePDCCHs, a sub-block that is not sufficient for placing an ePDCCH is removed from the search space, where a sub-block in a foremost PRB pair may be removed, or a sub-block in a last PRB pair may be removed.

Or, all sub-blocks of all PRB pairs are grouped according to the foregoing method, and interleave elements obtained through grouping are arranged into an interleave matrix according to the method described in the foregoing embodiment. When the number of rows multiplied by the number of columns of the interleave matrix is larger than the number of interleave elements, null (NULL) elements are used to fill the interleave matrix up. When candidate ePDCCHs are mapped to the interleave elements in the interleave matrix, if it is determined that row and column positions in the interleave matrix, to which a certain candidate ePDCCH is mapped, are a null element, the row and column positions are skipped until next row and column positions for placing the interleave element are found.

A method for a UE to receive the control channel is substantially the same as that in Embodiment 1, and a difference lies in that an interleaving method and a mapping method adopted by the UE side are methods adopted by the base station in this Embodiment 5.

In the method provided in the embodiment of the present invention, grouping is performed, according to an aggregation level of the to-be-transmitted control channel, on the sub-blocks in the physical resource blocks configured by the base station for the to-be-transmitted control channel, then interleaving is performed, and then the candidate control channels are mapped to the interleaved sub-blocks, so that any candidate control channel of the to-be-transmitted control channel is sent on consecutive time-frequency resources as possible, and meanwhile different candidate control channels are on different PRB pairs as possible. In this way, the base station may have better flexibility during actual sending of the ePDCCH, thereby not only achieving a precoding gain, but also achieving a larger scheduling gain.

Figure 7:
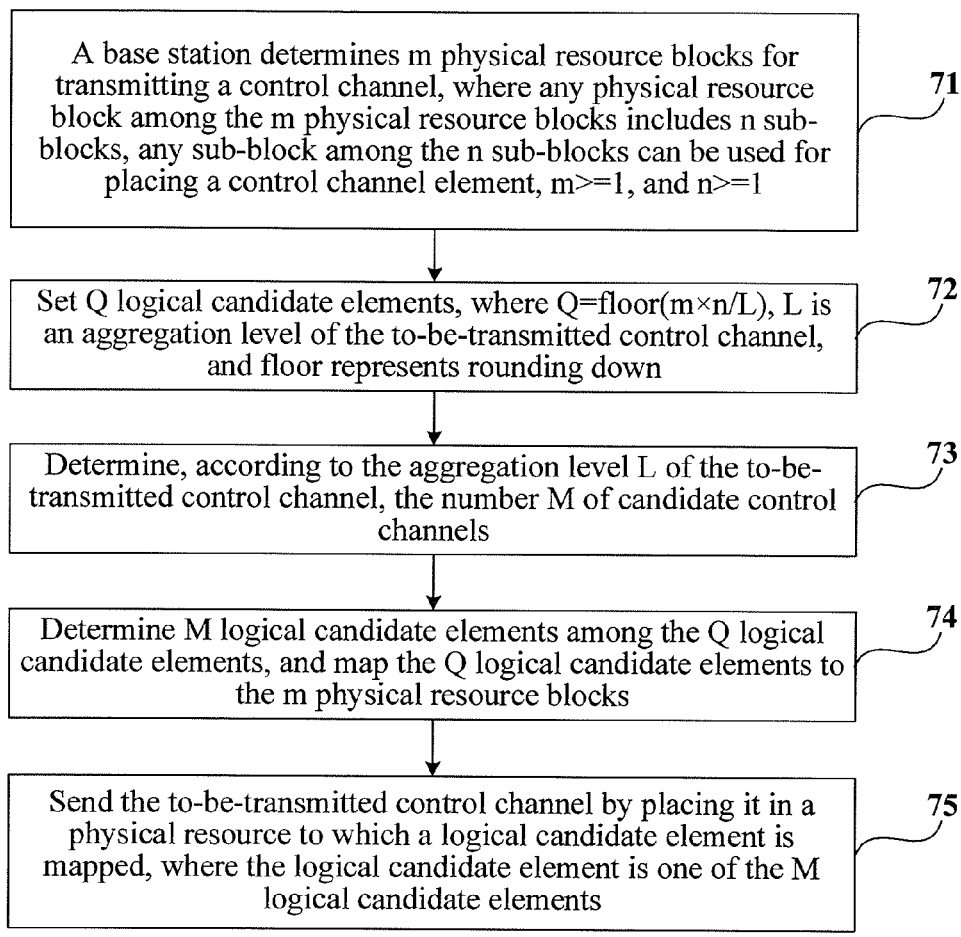
FIG. 7 is a flowchart of another method for transmitting a control channel according to an embodiment of the present invention.

FIG. 7 is a flowchart of another method for transmitting a control channel according to an embodiment of the present invention. The method described in this embodiment is executed by a base station, and as shown in FIG. 7, specifically includes:

Operation 71: A base station determines m physical resource blocks for transmitting a control channel, where any physical resource block among the m physical resource blocks includes n sub-blocks, any sub-block among the n sub-blocks can be used for placing a control channel element, m>=1, and n>=1.

Operation 72: Set Q logical candidate elements, where Q=floor(m×n/L), L is an aggregation level of the to-be-transmitted control channel, and floor represents rounding down.

Operation 73: Determine, according to the aggregation level L of the to-be-transmitted control channel, the number M of candidate control channels.

For the determining the number M of candidate control channels, M consecutive logical candidate elements among the Q logical candidate elements may be determined according to a user equipment-specific parameter.

Operation 74: Determine M logical candidate elements among the Q logical candidate elements, and map the Q logical candidate elements to the m physical resource blocks. The logical candidate elements may be understood as virtual physical resources that can be used for placing a control channel.

Operation 75: Send the to-be-transmitted control channel by placing it in a physical resource to which a logical candidate element is mapped, where the logical candidate element is one of the M logical candidate elements.

The mapping the Q logical candidate elements to the m physical resource blocks includes:

setting index numbers of the Q logical candidate elements to be q=I, I+1, . . . , I+Q−1, where I is an integer;

setting, according to a sequence of the m physical resource blocks, virtual numbers r=J, J+1, . . . , J+m−1 for the m physical resource blocks, where J is an integer;

dividing each physical resource block among the m physical resource blocks into P basic candidate elements, where a basic candidate element includes L consecutive sub-blocks, K=floor(n/L), an index number of the basic candidate element is (k, r), k=W, W+1, . . . , W+P−1, and W is an integer; and mapping the Q logical candidate elements to physical resources corresponding to Q basic candidate elements.

The mapping the Q logical candidate elements to physical resources corresponding to Q basic candidate elements includes:

a first step: setting q=I, k=W, and r=J;

a second step: mapping a $q^{th}$ logical candidate element to a physical resource corresponding to the basic candidate element (k, r), and executing a third step;

the third step: setting q=q+1; if q>I+Q−1, ending the mapping; otherwise, executing a fourth step;

the fourth step: setting r=r+1;

if r<m, executing the second step;

if r=m, setting r=0, and executing a fifth step; and a fifth step: setting k=k+1; k=k mod P, and executing the second step.

Or, when m is an even number, the mapping the Q logical candidate elements to physical resources corresponding to Q basic candidate elements includes:

a first step: setting q=I, and k=W;

a second step: setting i=(q−I) mod m, where i is a variable;

if i is an even number, r=i+J;

if i is an odd number and i<floor(m/2), r=i+J+floor(m/2);

if i is an odd number and i>=floor(m/2), r=i+J−floor(m/2);

mapping a $q^{th}$ logical candidate element to a physical resource corresponding to the basic candidate element (k, r), and executing a third step;

the third step: q=q+1;

if q>I+Q−1, ending the mapping;

otherwise, if (q−I) mod m=0, executing a fourth step, and if (q−I) mod m≠0, executing the second step; and the fourth step: k=k+1; k=(k−W) mod P, and executing the second step.

Or, when m is an even number, the mapping the Q logical candidate elements to physical resources corresponding to Q basic candidate elements includes:

a first step: setting q=I, and k=W;

a second step: setting i=(q−I) mod m, where i is a variable;

if i is an odd number, r=i+J;

if i is an even number and i<floor(m/2), r=i+J+floor(m/2);

if i is an even number and i>=floor(m/2), r=i+J−floor(m/2);

mapping a $q^{th}$ logical candidate element to a physical resource corresponding to the basic candidate element (k, r), and executing a third step;

the third step: q=q+1;

if q>I+Q−1, ending the mapping;

otherwise, if (q−I) mod m=0, executing a fourth step, and if (q−I) mod m≠0, executing the second step; and the fourth step: k=k+1; k=(k−W) mod P, and executing the second step.

Or, when m is an odd number, the mapping the Q logical candidate elements to physical resources corresponding to Q basic candidate elements includes:

a first step: setting q=I, and k=W;

a second step: setting i=(q—I) mod m, where i is a variable;

if i is an even number or i=m−1, r=i+J; if i is an odd number and i<floor(m/2), r=i+J+floor(m/2); if i is an odd number, i!=m−1, and i>=floor(m/2), r=i+J−floor(m/2);

mapping a $q^{th}$ logical candidate element to a physical resource corresponding to the basic candidate element (k, r), and executing a third step;

the third step: q=q+1;

if q>I+Q−1, ending the mapping;

otherwise, if (q−I) mod m=0, executing a fourth step, and if (q−I) mod m≠0, executing the second step; and the fourth step: k=k+1; k=(k−W) mod P, and executing the second step.

Or, when m is an odd number, the mapping the Q logical candidate elements to physical resources corresponding to Q basic candidate elements includes:

a first step: setting q=I, and k=W;

a second step: setting i=(q−I) mod m, where i is a variable;

if i is an odd number or i=m−1, r=i+J;

if i is an even number and i<floor(m/2), r=i+J+floor(m/2);

if i is an even number, i!=m−1, and i>=floor(m/2), r=i+J−floor(m/2);

mapping a $q^{th}$ logical candidate element to a physical resource corresponding to the basic candidate element (k, r), and executing a third step;

the third step: q=q+1;

if q>I+Q−1, ending the mapping;

otherwise, if (q−I) mod m=0, executing a fourth step, and if (q−I) mod m≠0, executing the second step; and the fourth step: k=k+1; k=(k−W) mod P, and executing the second step.

Or, when m is an odd number, the mapping the Q logical candidate elements to physical resources corresponding to Q basic candidate elements includes:

a first step: setting q=I, and k=W;

a second step: setting i=(q−I) mod m, where i is a variable;

if i is an even number or i=0, r=i+J;

if i is an odd number, i!=0, and i<floor(m/2)+1, r=i+J+floor(m/2);

if i is an odd number, (i+J)!=m−1, and i>=floor(m/2)+1, r=i+J−floor(m/2);

mapping a $q^{th}$ logical candidate element to a physical resource corresponding to the basic candidate element (k, r), and executing a third step;

the third step: q=q+1;

if q>I+Q−1, ending the mapping;

otherwise, if (q−I) mod m=0, executing a fourth step, and if (q−I) mod m≠0, executing the second step; and the fourth step: k=k+1; k=(k−W) mod P, and executing the second step.

Or, when m is an odd number, the mapping the Q logical candidate elements to physical resources corresponding to Q basic candidate elements includes:

a first step: setting q=I, and k=W;

a second step: setting i=(q−I) mod m, where i is a variable;

if i is an odd number or i=0, r=i+J;

if i is an even number, i!=0, and i<floor(m/2)+1, r=i+J+floor(m/2);

if i is an even number, (i+J)!=m−1, and i>=floor(m/2)+1, r=i+J−floor(m/2);

mapping a $q^{th}$ logical candidate element to a physical resource corresponding to the basic candidate element (k, r), and executing a third step;

the third step: q=q+1;

if q>I+Q−1, ending the mapping;

otherwise, if (q−I) mod m=0, executing a fourth step, and if (q−I) mod m≠0, executing the second step; and the fourth step: k=k+1; k=(k−W) mod P, and executing the second step.

Or, when m is an odd number, the mapping the Q logical candidate elements to physical resources corresponding to Q basic candidate elements includes:

a first step: setting q=I, and k=W;

a second step: setting i=(q−I) mod m, where i is a variable;

if i is an even number and i<m/2; or, if i=floor(m/2)+1; or, if i is an odd number and i>m/2, r=i+J;

if i is an odd number, and i<m/2, r=i+J+floor(m/2)+1;

if i is an even number, and i>m/2, r=i+J−floor(m/2)−1;

mapping a $q^{th}$ logical candidate element to a physical resource corresponding to the basic candidate element (k, r), and executing a third step;

the third step: q=q+1;

if q>I+Q−1, ending the mapping;

otherwise, if (q−I) mod m=0, executing a fourth step, and if (q−I) mod m≠0, executing the second step; and the fourth step: k=k+1; k=(k−W) mod P, and executing the second step.

Or, when m is an odd number, the mapping the Q logical candidate elements to physical resources corresponding to Q basic candidate elements includes:

a first step: setting q=I, and k=W;

a second step: setting i=(q−I) mod m, where i is a variable;

if i is an odd number and i<m/2; or, if i=floor(m/2)+1; or, if i is an even number and i>m/2, r=i+J;

if i is an even number and i<m/2, r=i+J+floor(m/2)+1;

if i is an odd number, and i>m/2, r=i+J−floor(m/2)−1;

mapping a $q^{th}$ logical candidate element to a physical resource corresponding to the basic candidate element (k, r), and executing a third step;

the third step: q=q+1;

if q>I+Q−1, ending the mapping;

otherwise, if (q−I) mod m=0, executing a fourth step, and if (q−I) mod m≠0, executing the second step; and the fourth step: k=k+1; k=(k−W) mod P, and executing the second step.

Correspondingly, FIG. 8 is a flowchart of another method for receiving control information according to an embodiment of the present invention. The method described in this embodiment is executed by a UE, and as shown in FIG. 8, includes:

Operation 81: Obtain information of m physical resource blocks for transmitting a control channel, where any physical resource block among the m physical resource blocks includes n sub-blocks, any sub-block among the n sub-blocks can be used for placing a control channel element, m>=1, and n>=1.

Operation 82: Receive, according to the information, control channel elements in m×n sub-blocks of the m physical resource blocks.

Operation 83: For an aggregation level $L_K$, determine the number $M_{L_K}$ of corresponding candidate control channels, where L is an integer, K is an integer, and $L_K$ is any one of K aggregation levels.

Operation 84: Set $Q_{L_K}$ logical candidate elements, where $Q_{L_K}$=floor(m×n/$L_K$), and floor represents rounding down.

Operation 85: Determine $M_{L_K}$ logical candidate elements among the $Q_{L_K}$ logical candidate elements, and map the $Q_{L_K}$ logical candidate elements to the m physical resource blocks.

Operation 86: Perform detection on physical resources to which the $M_{L_K}$ logical candidate elements are mapped; when a correct control channel is detected, obtain, through parsing, the to-be-received control information from the correct control channel; when no correct control channel is detected, for another aggregation level among the K aggregation levels, continue to execute, starting from the determining the number of corresponding candidate control channels, subsequent steps until a correct control channel is detected or all the control channel elements in the m×n sub-blocks are traversed.

The operation of determining $M_{L_K}$ logical candidate elements among the $Q_{L_K}$ logical candidate elements is the same as that in the method of the embodiment shown in FIG. 7, and includes:

determining, according to a user equipment-specific parameter, $M_{L_K}$ consecutive logical candidate elements among the $Q_{L_K}$ logical candidate elements.

The mapping the $Q_{L_K}$ logical candidate elements to the m physical resource blocks includes:

setting index numbers of the $Q_{L_K}$ logical candidate elements to be q=I, I+1, . . . , I+$Q_{L_K}$−1, where I is an integer;

setting, according to a sequence of the m physical resource blocks, virtual numbers r=J, J+1, . . . , J+m−1 for the m physical resource blocks, where J is an integer;

dividing each physical resource block among the m physical resource blocks into $P_{L_K}$ basic candidate elements, where a basic candidate element includes L consecutive sub-blocks, $P_{L_K}$=floor(n/$L_K$), an index number of the basic candidate element is (k, r), k=W, W+1, . . . , W+$P_{L_K}$−1, and W is an integer; and mapping the $Q_{L_K}$ logical candidate elements to physical resources corresponding to $Q_{L_K}$ basic candidate elements.

The operation of mapping the $Q_{L_K}$ logical candidate elements to physical resources corresponding to $Q_{L_K}$ basic candidate elements is the same as that in the method of the embodiment shown in FIG. 7.

Specifically, the mapping the $Q_{L_K}$ logical candidate elements to physical resources corresponding to $Q_{L_K}$ basic candidate elements may include:

a first step: setting q=I, k=W, and r=J;

a second step: mapping a $q^{th}$ logical candidate element to a physical resource corresponding to the basic candidate element (k, r), and executing a third step;

the third step: setting q=q+1; if q>I+$Q_{L_K}$−1, ending the mapping; otherwise, executing a fourth step;

the fourth step: setting r=r+1;

if r<m, executing the second step;

if r=m, setting r=0, and executing a fifth step; and the fifth step: setting k=k+1; k=k mod $P_{L_K}$, and executing the second step.

Or, when m is an even number, the mapping the $Q_{L_K}$ logical candidate elements to physical resources corresponding to $Q_{L_K}$ basic candidate elements includes:

a first step: setting q=I, and k=W;

a second step: setting i=(q−I) mod m, where i is a variable;

if i is an even number, r=i+J;

if i is an odd number and i<floor(m/2), r=i+J+floor(m/2);

if i is an odd number and i>=floor(m/2), r=i+J−floor(m/2);

mapping a $q^{th}$ logical candidate element to a physical resource corresponding to the basic candidate element (k, r), and executing a third step;

the third step: q=q+1;
if q>I+Q−1, ending the mapping;
otherwise, if (q−I) mod m=0, executing a fourth step, and if (q−I) mod m≠0, executing the second step; and
the fourth step: k=k+1; k=(k−W) mod $P_{L_K}$, and executing the second step.

Or, when m is an even number, the mapping the $Q_{L_K}$ logical candidate elements to physical resources corresponding to $Q_{L_K}$ basic candidate elements includes:
a first step: setting q=I, and k=W;
a second step: setting i=(q−I) mod m, where i is a variable;
if i is an odd number, r=i+J;
if i is an even number and i<floor(m/2), r=i+J+floor(m/2);
if i is an even number and i>=floor(m/2), r=i+J−floor(m/2);
mapping a $q^{th}$ logical candidate element to a physical resource corresponding to the basic candidate element (k, r), and executing a third step;
the third step: q=q+1;
if q>I+$Q_{L_K}$−1, ending the mapping;
otherwise, if (q−I) mod m=0, executing a fourth step, and if (q−I) mod m≠0, executing the second step; and
the fourth step: k=k+1; k=(k−W) mod $P_{L_K}$, and executing the second step.

Or, when m is an odd number, the mapping the $Q_{L_K}$ logical candidate elements to physical resources corresponding to $Q_{L_K}$ basic candidate elements includes:
a first step: setting q=I, and k=W;
a second step: setting i=(q−I) mod m, where i is a variable;
if i is an even number or i=m−1, r=i+J;
if i is an odd number and i<floor(m/2), r=i+J+floor(m/2);
if i is an odd number, i!=m−1, and i>=floor(m/2), r=i+J−floor(m/2);
mapping a $q^{th}$ logical candidate element to a physical resource corresponding to the basic candidate element (k, r), and executing a third step;
the third step: q=q+1;
if q>I+$Q_{L_K}$−1, ending the mapping; otherwise, if (q−I) mod m=0, executing a four step, and if (q−I) mod m≠0 executing the second step; and
the fourth step: k=k+1; k=(k−W) mod $P_{L_K}$, and executing the second step.

Or, when m is an odd number, the mapping the $Q_{L_K}$ logical candidate elements to physical resources corresponding to $Q_{L_K}$ basic candidate elements includes:
a first step: setting q=I, and k=W;
a second step: setting i=(q−I) mod m, where i is a variable;
if i is an odd number or i=m−1, r=i+J;
if i is an even number and i<floor(m/2), r=i+J+floor(m/2);
if i is an even number, i!=m−1, and i>=floor(m/2), r=i+J−floor(m/2);
mapping a $q^{th}$ logical candidate element to a physical resource corresponding to the basic candidate element (k, r), and executing a third step;
the third step: q=q+1;
if q>I+$Q_{L_K}$−1, ending the mapping;
otherwise, if (q−I) mod m=0, executing a fourth step, and if (q−I) mod m≠0, executing the second step; and
the fourth step: k=k+1; k=(k−W) mod $P_{L_K}$, and executing the second step.

Or, when m is an odd number, the mapping the $Q_{L_K}$ logical candidate elements to physical resources corresponding to $Q_{L_K}$ basic candidate elements includes:
a first step: setting q=I, and k=W;
a second step: setting i=(q−I) mod m, where i is a variable;
if i is an even number or i=0, r=i+J;

if i is an odd number, i!=0, and i<floor(m/2), r=i+J+floor(m/2);
if i is an odd number, (i+J)!=m−1, and i>=floor(m/2)+1, r=i+J−floor(m/2);
mapping a $q^{th}$ logical candidate element to a physical resource corresponding to the basic candidate element (k, r), and executing a third step;
the third step: q=q+1;
if q>I+$Q_{L_K}$−1, ending the mapping;
otherwise, if (q−I) mod m=0, executing a fourth step, and if (q−I) mod m≠0, executing the second step; and
the fourth step: k=k+1; k=(k−W) mod $P_{L_K}$, and executing the second step.

Or, when m is an odd number, the mapping the $Q_{L_K}$ logical candidate elements to physical resources corresponding to $Q_{L_K}$ basic candidate elements includes:
a first step: setting q=I, and k=W;
a second step: setting i=(q−I) mod m, where i is a variable;
if i is an odd number or i=0, r=i+J;
if i is an even number, i!=0, and i<floor(m/2)+1, r=i+J+floor(m/2);
if i is an even number, (i+J)!=m−1, and i>=floor(m/2)+1, r=i+J−floor(m/2);
mapping a $q^{th}$ logical candidate element to a physical resource corresponding to the basic candidate element (k, r), and executing a third step;
the third step: q=q+1;
if q>I+$Q_{L_K}$−1, ending the mapping;
otherwise, if (q−I) mod m=0, executing a fourth step, and if (q−I) mod m≠0, executing the second step; and
the fourth step: k=k+1; k=(k−W) mod $P_{L_K}$, and executing the second step.

Or, when m is an odd number, the mapping the $Q_{L_K}$ logical candidate elements to physical resources corresponding to $Q_{L_K}$ basic candidate elements includes:
a first step: setting q=I, and k=W;
a second step: setting i=(q−I) mod m, where i is a variable;
if i is an even number and i<m/2; or, if i=floor(m/2)+1; or, if i is an odd number and i>m/2, r=i+J;
if i is an odd number, and i<m/2, r=i+J+floor(m/2)+1;
if i is an even number, and i>m/2, r=i+J−floor(m/2)−1;
mapping a $q^{th}$ logical candidate element to a physical resource corresponding to the basic candidate element (k, r), and executing a third step;
the third step: q=q+1;
if q>I+$Q_{L_K}$−1, ending the mapping; otherwise, if (q−I) mod m=0, executing a fourth step, and if (q−I) mod m≠0, executing the second step; and
the fourth step: k=k+1; k=(k−W) mod $P_{L_K}$, and executing the second step.

Or, when m is an odd number, the mapping the $Q_{L_K}$ logical candidate elements to physical resources corresponding to $Q_{L_K}$ basic candidate elements includes:
a first step: setting q=I, and k=W;
a second step: setting i=(q−I) mod m, where i is a variable;
if i is an odd number and i<m/2; or, if i=floor(m/2)+1; or, if i is an even number and i>m/2, r=i+J;
if i is an even number and i<m/2, r=i+J+floor(m/2)+1;
if i is an odd number, and i>m/2, r=i+J+floor(m/2)−1;
mapping a $q^{th}$ logical candidate element to a physical resource corresponding to the basic candidate element (k, r), and executing a third step;
the third step: q=q+1;
if q>I+$Q_{L_K}$−1, ending the mapping;
otherwise, if (q−I) mod m=0, executing a fourth step, and if (q−I) mod m≠0, executing the second step; and the fourth step: k=k+1; k=(k−W) mod $P_{L_k}$, and executing the second step.

In the embodiment of the present invention, the determining M logical candidate elements or interleave elements according to the UE-specific parameter may also be specifically implemented through the following manner.

The logical candidate elements are used as an example, and it is assumed that in configured PRB pairs, for the aggregation level L, the number of candidate ePDCCHs is M, and the number of logical candidate elements is Q. A method for determining indexes of M logical candidates according to the UE-specific parameter includes:

using a formula I=(A×D) mod (Q) to determine an index number of a first logical candidate element among the M logical candidate elements, where M consecutive logical candidate elements I, I+1, . . . , I+M−1 starting from the determined index number of the first logical candidate element are finally determined M logical candidate elements.

A=39827, and D is the UE-specific parameter, such as an UE identification number of the UE and a UE-specific number configured by the base station for the UE.

Or, a formula $I_k$=(A×$I_{k-1}$) mod (Q) is used to determine an index number of a first logical candidate element among the M logical candidate elements, where M consecutive logical candidate elements starting from the determined index number of the first logical candidate element are finally determined M logical candidate elements. Index numbers of the M consecutive logical candidate elements are not consecutive.

k=0, 1, . . . , M−1, A=39827, and $I_{-1}$=D, which is the UE-specific parameter, such as an UE identification number of the UE and a UE-specific number configured by the base station for the UE.

The methods shown in FIG. 7 and FIG. 8 are further illustrated below in detail through Embodiment 6 and Embodiment 7.

Embodiment 6

Figure 9:
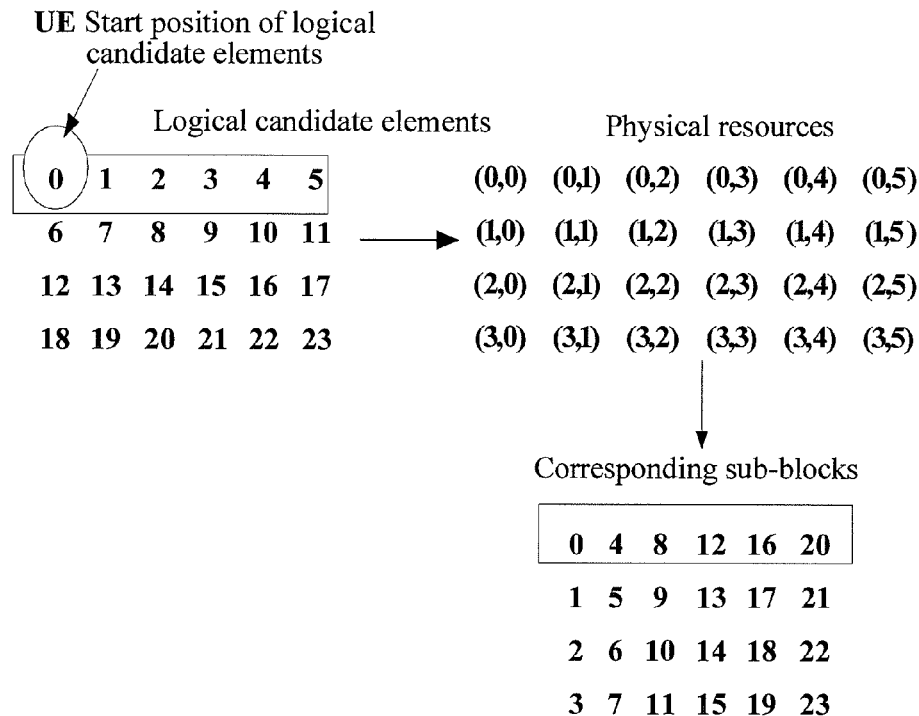
FIG. 9 is a schematic configuration diagram of a physical resource in a method for transmitting a control channel according to Embodiment 6 of the present invention.

FIG. 9 is a schematic configuration diagram of a physical resource in a method for transmitting a control channel according to Embodiment 6 of the present invention.

In this embodiment, a base station needs to send an ePDCCH with an aggregation level being 1, and configures 6 PRB pairs for the to-be-transmitted ePDCCH: a PRB pair 0, a PRB pair 2, a PRB pair 4, a PRB pair 7, a PRB pair 9, and a PRB pair 11.

Each PRB pair includes 4 sub-blocks, and the 6 PRB pairs have a total of 24 sub-blocks.

According to Q=floor(m×n/L)=floor(6×4/1)=24, 24 logical candidate elements are set, and index numbers q=I, I+1, . . . , I+23, where I may be any integer.

According to a sequence of the 6 PRB pairs, virtual numbers r=J, J+1, J+5 are set for the 6 PRB pairs, where J is an integer.

According to K=floor(n/L)=floor(4/1)=4, the sub-blocks in each PRB pair among the 6 PRB pairs are divided into 4 basic candidate elements, and since the aggregation level is 1 herein, 1 sub-block is actually 1 basic candidate element.

An index number of the basic candidate element in the 6 PRB pairs is (k, r), that is, a $P^{th}$ basic candidate element in an $r^{th}$ PRB pair, where k=W, W+1, . . . , W+3, and W is an integer.

The mapping the 24 logical candidate elements to physical resources corresponding to 24 basic candidate elements includes:

a first step: setting q=I, k=W, and r=J, where for ease of description, in this embodiment, it is set that I=W=J=0;

a second step: mapping a $q^{th}$ logical candidate element to a physical resource corresponding to the basic candidate element (k, r), and executing a third step;

the third step: setting q=q+1; if q>I+Q−1, ending the mapping; otherwise, executing a fourth step;

the fourth step: setting r=r+1;

if r<m, executing the second step;

if r=m, setting r=0, and executing a fifth step; and the fifth step: setting k=k+1; k=k mod 4, and executing the second step.

A final mapping result is shown in FIG. 9. When 6 consecutive logical candidate elements determined by the base station among the 24 logical candidate elements according to a user-specific parameter are $0^{th}$ to $5^{th}$ logical candidate elements, they are, after being mapped to physical resources, a basic candidate element (0,0), a basic candidate element (0,1), a basic candidate element (0,2), a basic candidate element (0,3), a basic candidate element (0,4), and a basic candidate element (0,5), that is, 6 candidate ePDCCHs are actually mapped to a first sub-block in the PRB pair 0, a first sub-block in the PRB pair 2, a first sub-block in the PRB pair 4, a first sub-block in the PRB pair 7, a first sub-block in the PRB pair 9, and a first sub-block in the PRB pair 11 respectively.

The to-be-transmitted ePDCCH is placed on a sub-block among the first sub-block in the PRB pair 0, the first sub-block in the PRB pair 2, the first sub-block in the PRB pair 4, the first sub-block in the PRB pair 7, the first sub-block in the PRB pair 9, and the first sub-block in the PRB pair 11 for sending.

Correspondingly, when the UE side receives the control channel, the UE first obtains search space information of the to-be-received ePDCCH: the PRB pair 0, the PRB pair 2, the PRB pair 4, and the PRB pair 7. The UE may obtain the search space information from information sent by the base station.

The UE does not know the aggregation level of the to-be-received ePDCCH, so that for all predefined aggregation levels, such as 1, 2, 4, and 8, the UE adopts the same interleaving method as the base station, then maps the candidate ePDCCHs to an interleave element that is interleaved, and detects an ePDCCH placed in the interleave element that is mapped to. The interleaving method and the mapping method of the base station may be solidified in the UE.

If for the aggregation level 8, the UE cannot detect the correct ePDCCH by adopting the foregoing method, the UE continues to perform searching for an aggregation level among the aggregation levels 1, 2, and 4 according to the foregoing method in this embodiment.

If for the aggregation level 1, the UE detects the correct ePDCCH by adopting the foregoing method in this embodiment, the UE obtains, through parsing, control information from the ePDCCH, and stops receiving the control channel, so as not to search the search space again for cases of the rest aggregation levels 2 and 4.

In this embodiment, the UE detects the correct control channel in the first sub-block in the PRB pair 0, the first sub-block in the PRB pair 2, the first sub-block in the PRB pair 4, the first sub-block in the PRB pair 7, the first sub-block in the PRB pair 9, and the first sub-block in the PRB pair 11.

Embodiment 7

Figure 10:
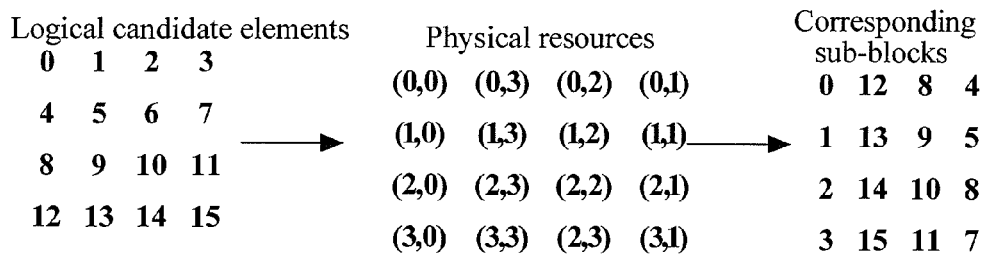
FIG. 10 is a schematic diagram of a mapping in a method for transmitting a control channel according to Embodiment 7 of the present invention.

FIG. 10 is a schematic diagram of a mapping in a method for transmitting a control channel according to Embodiment 7 of the present invention.

In this embodiment, an aggregation level of an ePDCCH to be transmitted by a base station is 1, and PRB pairs configured by the base station for the to-be-transmitted ePDCCH are, as shown in FIG. 3A, PRB pairs 0, 2, 4, and 7.

Each PRB pair includes 4 sub-blocks, and the 4 PRB pairs have a total of 16 sub-blocks.

According to Q=floor(m×n/L)=floor(4×4/1)=16, 16 logical candidate elements are set, and index numbers q=I, I+1, . . . , I+15, where I may be any integer.

According to a sequence of the 4 PRB pairs, virtual numbers r=J, J+1, . . . , J+3 are set for the 4 PRB pairs, where J is an integer.

According to K=floor(n/L)=floor(4/1)=4, the sub-blocks in each PRB pair among the 4 PRB pairs are divided into 4 basic candidate elements, and since the aggregation level is 1 herein, 1 sub-block is actually 1 basic candidate element.

An index number of the basic candidate element in the 4 PRB pairs is (k, r), that is, a $P^{th}$ basic candidate element in an $r^{th}$ PRB pair, where k=W, W+1, . . . , W+3, and W is an integer.

The mapping the 16 logical candidate elements to physical resources corresponding to 16 basic candidate elements includes:

a first step: setting q=I, k=W, and r=J, where for ease of description, in this embodiment, it is set that I=W=J=0;

a second step: setting i=(q−I) mod m, where i is a variable;
if i is an even number, r=i+J;
if i is an odd number and i<floor(m/2), r=i+J+floor(m/2);
if i is an odd number and i>=floor(m/2), r=i+J−floor(m/2);
mapping a $q^{th}$ logical candidate element to a physical resource corresponding to the basic candidate element (k, r), and executing a third step;

the third step: q=q+1;
if q>I+Q−1, ending the mapping;
otherwise, if (q−I) mod m=0, executing a fourth step, and if (q−I) mod m≠0, executing the second step; and the fourth step: k=k+1; k=(k−W) mod P, and executing the second step.

A final mapping result is shown in FIG. 10. When 6 consecutive logical candidate elements determined by the base station among the 16 logical candidate elements according to a user-specific parameter are a logical candidate element 5, a logical candidate element 6, a logical candidate element 7, a logical candidate element 8, a logical candidate element 9, and a logical candidate element 10, they are, after being mapped to physical resources, a basic candidate element (1,3), a basic candidate element (1,2), a basic candidate element (1,1), a basic candidate element (2,0), a basic candidate element (2,3), and a basic candidate element (2,2), that is, 6 candidate ePDCCHs are actually mapped to a second sub-block in the PRB pair 7, a second sub-block in the PRB pair 4, a second sub-block in the PRB pair 2, a third sub-block in the PRB pair 0, a third sub-block in the PRB pair 7, and a third sub-block in the PRB pair 4 respectively.

The to-be-transmitted ePDCCH is placed on a sub-block among the second sub-block in the PRB pair 7, the second sub-block in the PRB pair 4, the second sub-block in the PRB pair 2, the third sub-block in the PRB pair 0, the third sub-block in the PRB pair 7, and the third sub-block in the PRB pair 4 for sending.

A method for a UE to receive the control channel is substantially the same as that in Embodiment 6, and a difference lies in that the mapping method is the mapping method of the base station in this Embodiment 7.

In this embodiment, the UE detects the correct control channel in the second sub-block in the PRB pair 7, the second sub-block in the PRB pair 4, the second sub-block in the PRB pair 2, the third sub-block in the PRB pair 0, the third sub-block in the PRB pair 7, and the third sub-block in the PRB pair 4.

Figure 11:
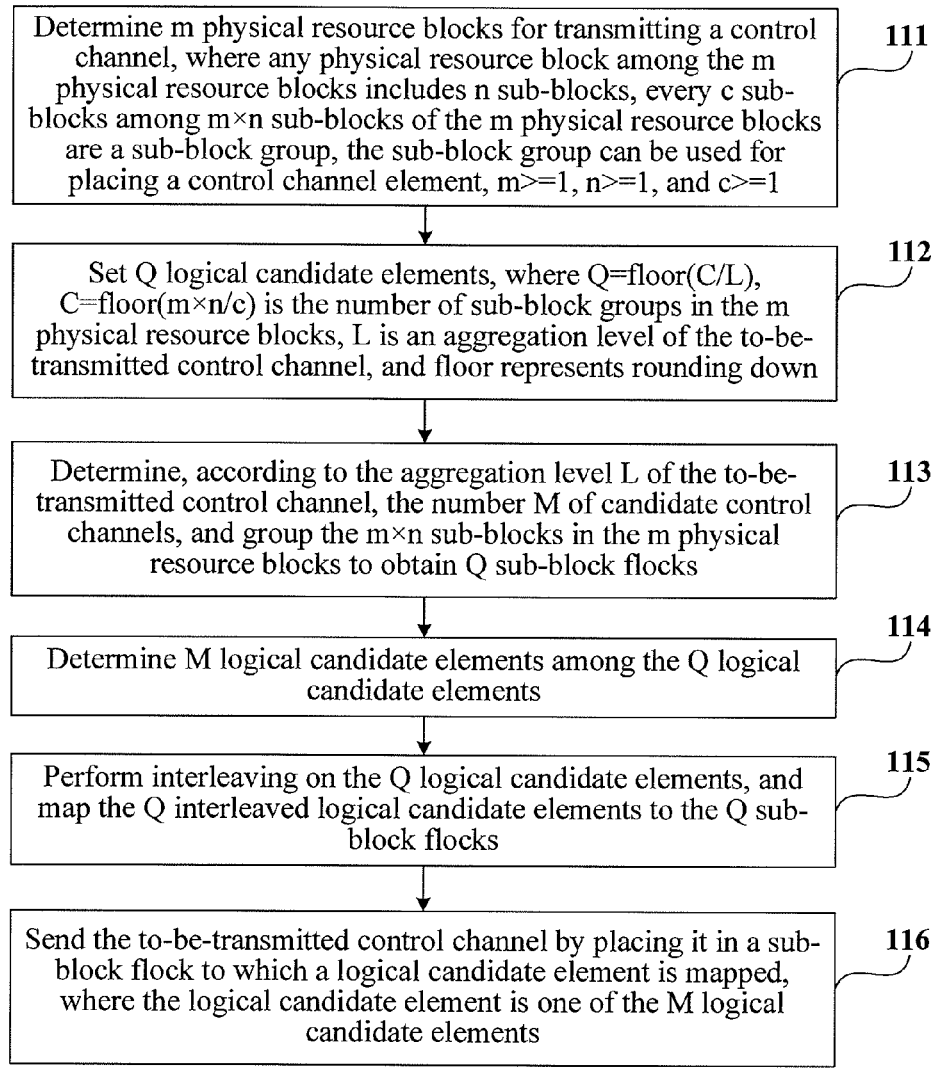
FIG. 11 is a flowchart of another method for transmitting a control channel according to an embodiment of the present invention.

FIG. 11 is a flowchart of another method for transmitting a control channel according to an embodiment of the present invention. The method described in this embodiment is executed by a base station, and as shown in FIG. 11, specifically includes:

Operation 111: Determine m physical resource blocks for transmitting a control channel, where any physical resource block among the m physical resource blocks includes n sub-blocks, every c sub-blocks among m×n sub-blocks of the m physical resource blocks are a sub-block group, the sub-block group can be used for placing a control channel element, m>=1, n>=1, and c>=1.

Operation 112: Set Q logical candidate elements, where Q=floor(C/L), C=floor(m×n/c) is the number of sub-block groups in the m physical resource blocks, L is an aggregation level of the to-be-transmitted control channel, and floor represents rounding down.

Operation 113: Determine, according to the aggregation level L of the to-be-transmitted control channel, the number M of candidate control channels, and group the m×n sub-blocks in the m physical resource blocks to obtain Q sub-blocks.

Operation 114: Determine M logical candidate elements among the Q logical candidate elements.

Operation 115: Perform interleaving on the Q logical candidate elements, and map the Q interleaved logical candidate elements to the Q sub-blocks.

Operation 116: Send the to-be-transmitted control channel by placing it in a sub-block to which a logical candidate element is mapped, where the logical candidate element is one of the M logical candidate elements.

The determining M logical candidate elements among the Q logical candidate elements includes:

determining, according to a user equipment-specific parameter, the M logical candidate elements among the Q logical candidate elements.

The M logical candidate elements may be M consecutive logical candidate elements.

The grouping the m×n sub-blocks in the m physical resource blocks to obtain Q sub-blocks includes:

after cascading the m physical resource blocks according to a sequence of numbers, performing grouping from a first sub-block to obtain the Q sub-blocks, where a sub-block includes L×c consecutive sub-blocks.

The performing interleaving on the Q logical candidate elements includes:

setting a first matrix with the number of rows being Y and the number of columns being Z, where Y and Z are both integers, and Y×Z>=Q;

setting index numbers of the Q logical candidate elements to be q=I, I+1, . . . , I+Q−1, where I is an integer;

setting Y×Z−Q null elements before the index number q=I of the logical candidate element or setting Y×Z−Q null elements after the index number q=I+Q−1 of the logical candidate element to obtain Y×Z logical filling elements, where the Y×Z logical filling elements include the Y×Z−Q null elements and the index numbers I, I+1, . . . , I+Q−1 of the Q logical candidate elements;

writing the Y×Z logical filling elements into the first matrix according to rows to obtain a first filled matrix; and performing, according to row and column positions of the first filled matrix, reading according to columns to obtain the Q interleaved logical candidate elements, where the performing reading according to columns refers to rearranging the index numbers of the Q logical candidate elements in order from top to bottom and from left to right, and during the reading, if a null element exists, the reading skips the element;

or, writing the Y×Z logical filling elements into the first matrix according to columns to obtain a first filled matrix; and performing, according to row and column positions of the first filled matrix, reading according to rows to obtain the Q interleaved logical candidate elements, where the performing reading according to rows refers to rearranging the index numbers of the Q logical candidate elements in order from left to right and from top to bottom, and during the reading, if a null element exists, the reading skips the element.

Before the writing the Y×Z logical filling elements into the first matrix according to rows or according to columns to obtain the first filled matrix, the method further includes: performing interchanging, according to columns, on the first matrix into which the Y×Z logical filling elements are written.

A person skilled in the art should understand that the interchanging may also be performed on the first matrix according to rows.

The number of times of the interchanging may be one and may also be multiple.

The performing interchanging, according to columns, on the first matrix into which the Y×Z logical filling elements are written includes:

dividing an interleave matrix into two parts according to columns, where the interleave matrix is the first matrix into which the Y×Z logical filling elements are written;

if Z is an even number, interchanging a $(2i)^{th}$ column and a $(2i+Z/2)^{th}$ column of the interleave matrix, where i is an integer, and $2<=2i<=Z/2$; or, interchanging a $(2i+1)^{th}$ column and a $(2i+Z/2+1)^{th}$ column of the interleave matrix, where $1<=2i+1<=Z/2$, so as to obtain the first filled matrix; and if Z is an odd number, interchanging a $(2j)^{th}$ column and a $(2j+floor(Z/2))^{th}$ column of the interleave matrix, where j is an integer, and $2<=2j<Z/2$; or, interchanging a $(2j+1)^{th}$ column and a $(2j+floor(Z/2)+1)^{th}$ column of the interleave matrix, where $1<=2j+1<Z/2$, so as to obtain the first filled matrix;

or, if Z is an odd number, interchanging a $(2j)^{th}$ column and a $(2j+floor(Z/2))^{th}$ column of the interleave matrix, where $2<=2j<=floor(Z/2)+1$; or, interchanging a $(2j+1)^{th}$ column and a $(2j+floor(Z/2)+1)^{th}$ column of the interleave matrix, where $1<2j+1<=floor(Z/2)+1$, so as to obtain the first filled matrix;

or, if Z is an odd number, interchanging a $(2j)^{th}$ column and a $(2j+floor(Z/2)+1)^{th}$ column of the interleave matrix, where $2<=2j<Z/2$; or, interchanging a $(2j+1)^{th}$ column and a $(2j+1+floor(Z/2)+1)^{th}$ column of the interleave matrix, where $1<=2j+1<Z/2$, so as to obtain the first filled matrix.

The mapping the Q interleaved logical candidate elements to the Q sub-blocks includes:

setting, according to a sequence of the Q sub-blocks, first index numbers q=I, I+1, . . . , I+Q−1 of the Q sub-blocks, where I is an integer;

arranging the first index numbers q starting from 1 sequentially from top to bottom and from left to right or sequentially from left to right and from top to bottom, to obtain a second matrix with the number of rows being Y and the number of columns being Z; and mapping the Q interleaved logical candidate elements to sub-blocks corresponding to the Q first index numbers in the second matrix in order from top to bottom and from left to right or in order from left to right and from top to bottom, where during the mapping, if a null element is encountered, the mapping skips to a next sub-block.

The arranging the index numbers q starting from 1 of the Q sub-blocks sequentially from top to bottom and from left to right or sequentially from left to right and from top to bottom, to obtain the second matrix with the number of rows being Y and the number of columns being Z includes:

setting Y×Z−Q null elements before the index number q=I of the Q sub-blocks to obtain Y×Z physical filling elements, where the Y×Z physical filling elements include the Y×Z−Q null elements and the index numbers q=I, I+1, I+Q−1 of the Q sub-blocks; and arranging the Y×Z physical filling elements sequentially from top to bottom and from left to right or sequentially from left to right and from top to bottom, to obtain the second matrix with the number of rows being Y and the number of columns being Z.

Or, Y=n/(L×c), and Z=m; and the mapping the Q interleaved logical candidate elements to sub-blocks corresponding to the Q first index numbers in the second matrix in order from top to bottom and from left to right includes:

replacing the Q first index numbers q with (k, r), where (k, r) represents a $k^{th}$ sub-block in an $r^{th}$ physical resource block, r is virtual numbers of the m physical resource blocks arranged in sequence, k=W, W+1, . . . , W+Y−1, r=J, J+1, . . . , J+m−1, and J and W are both integers; and mapping the Q interleaved logical candidate elements to sub-blocks corresponding to (k, r) in the second matrix in order from top to bottom and from left to right.

Or, Y=m, and Z=n/(L×c); and the mapping the Q interleaved logical candidate elements to sub-blocks corresponding to the Q first index numbers in the second matrix in order from top to bottom and from left to right includes:

replacing the Q first index numbers q with (k, r), where (k, r) represents a $k^{th}$ sub-block in an $r^{th}$ physical resource block, r is virtual numbers of the m physical resource blocks arranged in sequence, k=W, W+1, . . . , W+Z−1, r=J, J+1, . . . , J+m−1, and J and W are both integers; and mapping the Q interleaved logical candidate elements to sub-blocks corresponding to (k, r) in the second matrix in order from left to right and from top to bottom.

Figure 12:
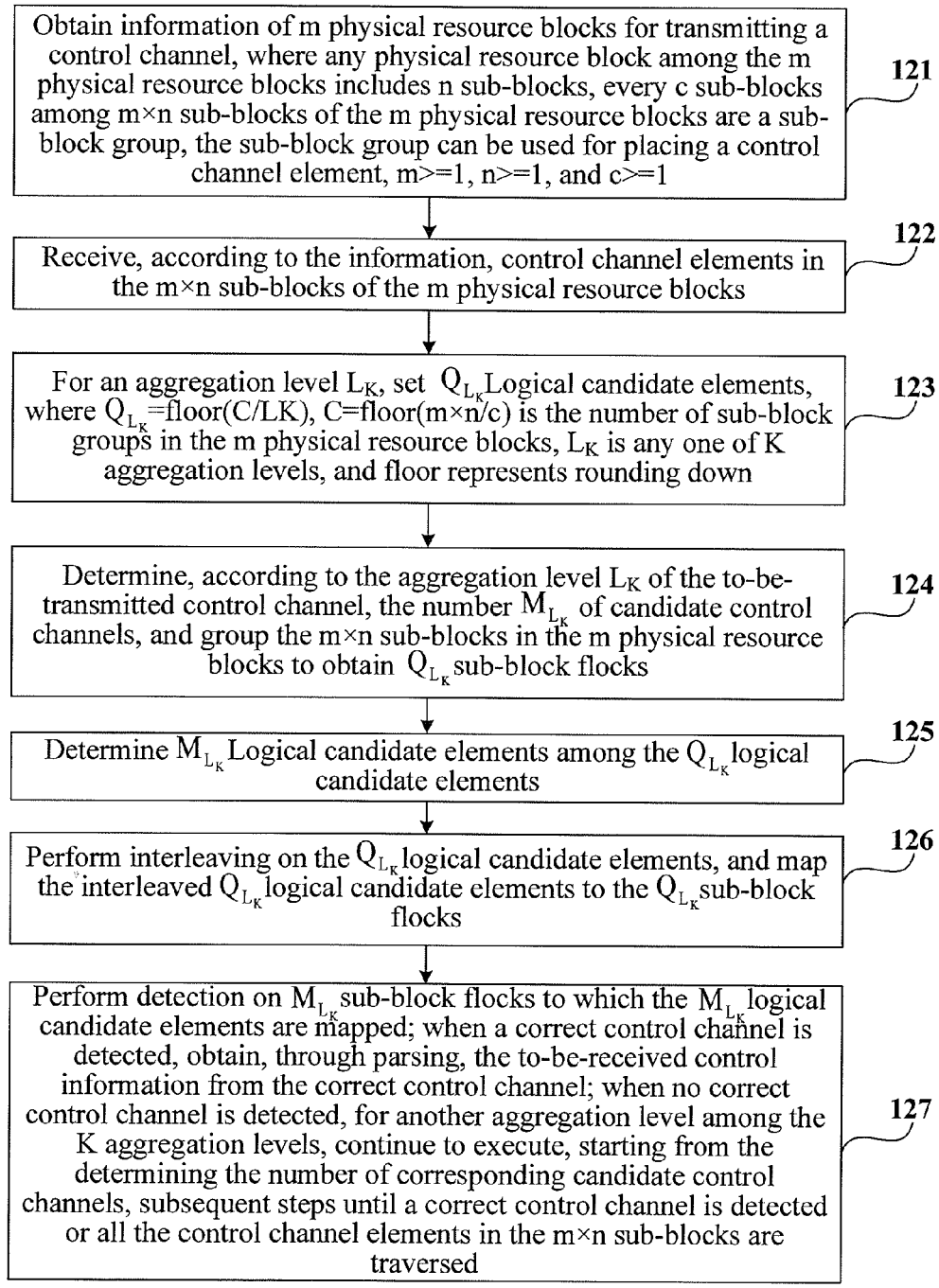
FIG. 12 is a flowchart of another method for receiving a control channel according to an embodiment of the present invention.

FIG. 12 is a flowchart of another method for receiving a control channel according to an embodiment of the present invention. The method described in this embodiment is executed by a UE side, and as shown in FIG. 12, specifically includes:

Operation 121: Obtain information of m physical resource blocks for transmitting a control channel, where any physical resource block among the m physical resource blocks includes n sub-blocks, every c sub-blocks among m×n sub-blocks of the m physical resource blocks are a sub-block group, the sub-block group can be used for placing a control channel element, m>=1, n>=1, and c>=1.

Operation 122: Receive, according to the information, control channel elements in the m×n sub-blocks of the m physical resource blocks.

Operation 123: For an aggregation level $L_K$, set $Q_{L_K}$ logical candidate elements, where $Q_{L_K}$=floor(C/$L_K$), C=floor (m×n/c) is the number of sub-block groups in the m physical resource blocks, $L_K$ is any one of K aggregation levels, and floor represents rounding down.

Operation 124: Determine, according to the aggregation level $L_K$ of the to-be-transmitted control channel, the number $M_{L_K}$ of candidate control channels, and group the m×n sub-blocks in the m physical resource blocks to obtain $Q_{L_K}$ sub-blocks.

Operation 125: Determine $M_{L_K}$ logical candidate elements among the $Q_{L_K}$ logical candidate elements.

Operation 126: Perform interleaving on the $Q_{L_K}$ logical candidate elements, and map the $Q_{L_K}$ interleaved logical candidate elements to the $Q_{L_K}$ sub-blocks.

Operation 127: Perform detection on $M_{L_K}$ sub-blocks to which the $M_{L_K}$ logical candidate elements are mapped; when a correct control channel is detected, obtain, through parsing, the to-be-received control information from the correct control channel; when no correct control channel is detected, for another aggregation level among the K aggregation levels, continue to execute, starting from the determining the number of corresponding candidate control channels, subsequent steps until a correct control channel is detected or all the control channel elements in the m×n sub-blocks are traversed.

The determining $M_{L_K}$ logical candidate elements among the $Q_{L_K}$ logical candidate elements includes:

determining, according to a user equipment-specific parameter, the $M_{L_K}$ logical candidate elements among the $Q_{L_K}$ logical candidate elements.

The $M_{L_K}$ logical candidate elements may be $M_{L_K}$ consecutive logical candidate elements.

The grouping the m×n sub-blocks in the m physical resource blocks to obtain $Q_{L_K}$ sub-blocks includes:

after cascading the m physical resource blocks according to a sequence of numbers, performing grouping from a first sub-block to obtain the $Q_{L_K}$ sub-blocks, where a sub-block includes L×c consecutive sub-blocks.

The performing interleaving on the $Q_{L_K}$ logical candidate elements includes:

setting a first matrix with the number of rows being Y and the number of columns being Z, where Y and Z are both integers, and $Y \times Z \geq Q_{L_K}$;

setting index numbers of the $Q_{L_K}$ logical candidate elements to be $q=I, I+1, \ldots, I+Q_{L_K}-1$, where I is an integer;

setting $Y \times Z - Q_{L_K}$ null elements before the index number $q=I$ of the logical candidate element or setting $Y \times Z - Q_{L_K}$ null elements after the index number $q=I+Q_{L_K}-1$ of the logical candidate element to obtain Y×Z logical filling elements, where the Y×Z logical filling elements include the $Y \times Z - Q_{L_K}$ null elements and the index numbers $I, I+1, \ldots, I+Q_{L_K}-1$ of the $Q_{L_K}$ logical candidate elements;

writing the Y×Z logical filling elements into the first matrix according to rows to obtain a first filled matrix; and performing, according to row and column positions of the first filled matrix, reading according to columns to obtain the $Q_{L_K}$ interleaved logical candidate elements, where the performing reading according to columns refers to rearranging the index numbers of the $Q_{L_K}$ logical candidate elements in order from top to bottom and from left to right, and during the reading, if a null element exists, the reading skips the element;

or, writing the Y×Z logical filling elements into the first matrix according to columns to obtain a first filled matrix; and performing, according to row and column positions of the first filled matrix, reading according to rows to obtain the $Q_{L_K}$ interleaved logical candidate elements, where the performing reading according to rows refers to rearranging the index numbers of the $Q_{L_K}$ logical candidate elements in order from left to right and from top to bottom, and during the reading, if a null element exists, the reading skips the element.

Before the writing the Y×Z logical filling elements into the first matrix according to rows or according to columns to obtain a first filled matrix, the method further includes: performing, according to columns, interchanging on the first matrix into which the Y×Z logical filling elements are written.

A person skilled in the art should understand that the interchanging may also be performed on the first matrix according to rows.

The number of times of the interchanging may be one and may also be multiple.

The performing, according to columns, interchanging on the first matrix into which the Y×Z logical filling elements are written includes:

dividing an interleave matrix into two parts according to columns, where the interleave matrix is the first matrix into which the Y×Z logical filling elements are written;

if Z is an even number, interchanging a $(2i)^{th}$ column and a $(2i+Z/2)^{th}$ column of the interleave matrix, where i is an integer and $2 \leq 2i \leq Z/2$; or, interchanging a $(2i+1)^{th}$ column and a $(2i+Z/2+1)^{th}$ column of the interleave matrix, where $1 \leq 2i+1 \leq Z/2$, so as to obtain the first filled matrix; and if Z is an odd number, interchanging a $(2j)^{th}$ column and a $(2j+\text{floor}(Z/2))^{th}$ column of the interleave matrix, where j is an integer, and $2 \leq 2j < Z/2$; or, interchanging a $(2j+1)^{th}$ column and a $(2j+\text{floor}(Z/2)+1)^{th}$ column of the interleave matrix, where $1 \leq 2j+1 < Z/2$, so as to obtain the first filled matrix;

or, if Z is an odd number, interchanging a $(2j)^{th}$ column and a $(2j+\text{floor}(Z/2))^{th}$ column of the interleave matrix, where $2 \leq 2j \leq \text{floor}(Z/2)+1$; or, interchanging a $(2j+1)^{th}$ column and a $(2j+\text{floor}(Z/2)+1)^{th}$ column of the interleave matrix, where $1 < 2j+1 \leq \text{floor}(Z/2)+1$, so as to obtain the first filled matrix;

or, if Z is an odd number, interchanging a $(2j)^{th}$ column and a $(2j+\text{floor}(Z/2)+1)^{th}$ column of the interleave matrix, where $2 \leq 2j < Z/2$; or, interchanging a $(2j+1)^{th}$ column and a $(2j+1+\text{floor}(Z/2)+1)^{th}$ column of the interleave matrix, where $1 \leq 2j+1 < Z/2$, so as to obtain the first filled matrix.

The mapping the $Q_{L_K}$ interleaved logical candidate elements to the $Q_{L_K}$ sub-blocks includes:

setting, according to a sequence of the $Q_{L_K}$ sub-blocks, first index numbers $q=I, I+1, \ldots, I+Q_{L_K}-1$ of the $Q_{L_K}$ sub-blocks, where I is an integer;

arranging the first index numbers q starting from I sequentially from top to bottom and from left to right or sequentially from left to right and from top to bottom, to obtain a second matrix with the number of rows being Y and the number of columns being Z; and mapping the $Q_{L_K}$ interleaved logical candidate elements to sub-blocks corresponding to the $Q_{L_K}$ first index numbers in the second matrix in order from top to bottom and from left to right or in order from left to right and from top to bottom, where during the mapping, if a null element is encountered, the mapping skips to a next sub-block.

The arranging the index numbers q, starting from I, of the $Q_{L_K}$ sub-blocks sequentially from top to bottom and from left to right or sequentially from left to right and from top to bottom, to obtain a second matrix with the number of rows being Y and the number of columns being Z includes:

setting $Y \times Z - Q_{L_K}$ null elements before the index number $q=I$ of the $Q_{L_K}$ sub-blocks to obtain Y×Z physical filling elements, where the Y×Z physical filling elements include the Y×Z−$Q_{L_K}$ null elements and the index numbers q=I, I+1, . . . , I+$Q_{L_K}$−1 of the $Q_{L_K}$ sub-blocks; and arranging the Y×Z physical filling elements sequentially from top to bottom and from left to right or sequentially from left to right and from top to bottom, to obtain the second matrix with the number of rows being Y and the number of columns being Z.

Y=n/(L×c), and Z=m; and the mapping the $Q_{L_K}$ interleaved logical candidate elements to sub-blocks corresponding to the $Q_{L_K}$ first index numbers in the second matrix in order from top to bottom and from left to right includes:

replacing the $Q_{L_K}$ first index numbers q with (k, r), where (k, r) represents a $k^{th}$ sub-block in an $r^{th}$ physical resource block, r is virtual numbers of the m physical resource blocks arranged in sequence, k=W, W+1, . . . , W+Y−1, r=J, J+1, . . . , J+m−1, and J and W are both integers; and mapping the $Q_{L_K}$ interleaved logical candidate elements to sub-blocks corresponding to (k, r) in the second matrix in order from top to bottom and from left to right.

Y=m, and Z=n/(L×c); and the mapping the interleaved logical candidate elements to sub-blocks corresponding to the $Q_{L_K}$ first index numbers in the second matrix in order from top to bottom and from left to right includes:

replacing the $Q_{L_K}$ first index numbers q with (k, r), where (k, r) represents a $k^{th}$ sub-block in an $r^{th}$ physical resource block, r is virtual numbers of the m physical resource blocks arranged in sequence, k=W, W+1, . . . , W+Z−1, r=J, J+1, . . . , J+m−1, and J and W are both integers; and mapping the $Q_{L_K}$ interleaved logical candidate elements to sub-blocks corresponding to (k, r) in the second matrix in order from left to right and from top to bottom.

The methods shown in FIG. 11 and FIG. 12 are further illustrated below in detail through Embodiment 8 to Embodiment 10.

Embodiment 8

In this embodiment, an aggregation level of a control channel to be transmitted by a base station is 1, and 6 PRB pairs are configured for the control channel. As shown in FIG. 4A and FIG. 4B, m=6, n=4, c=1, and L=1; C=floor (m×n/c)=24; and Q=floor(C/L)=24. It can be obtained that the 6 PRB pairs have 24 sub-blocks for placing the to-be-transmitted control channel, and the number of candidate control channels is 6.

24 logical candidate elements are set, and a first matrix with the number of rows being 4 and the number of columns being 6 is set.

Index numbers 0, 1, 2, . . . , 23 of the 24 logical candidate elements are set, and are written into the first matrix according to rows to obtain a first filled matrix:

```
 0  1  2  3  4  5
 6  7  8  9 10 11
12 13 14 15 16 17
18 19 20 21 22 23
```

A start position of 6 logical candidate elements among the 24 logical candidate elements is determined according to a UE-specific parameter, and is assumed to be 12, and $12^{th}$ to $17^{th}$ are used as the 6 determined logical candidate elements.

After reading is performed according to columns, 24 interleaved logical candidate elements are obtained: 0, 6, ⑫, 18, 1, 7, ⑬, 19, 2, 8, ⑭, 20, 3, 9, ⑮, 21, 4, 10, ⑯, 22, 5, 11, ⑰, and 23. The numbers marked by circles are the 6 determined logical candidate elements.

According to a sequence of the 6 PRB pairs, numbers of the 24 sub-blocks are set to be 0, 1, 2, . . . , 23.

The numbers 0, 1, 2, . . . , 23 of the 24 sub-blocks are arranged in order from left to right and from top to bottom to form a 6×4 matrix, or are arranged in order from top to bottom and from left to right to form a 4×6 matrix, then the 24 interleaved logical candidate elements 0, 6, 12, 18, 1, 7, 13, 19, 2, 8, 14, 20, 3, 9, 15, 21, 4, 10, 16, 22, 5, 11, 17, and 23 are mapped, according to rows or columns of the matrix formed by the 24 sub-blocks, to the sub-blocks corresponding to the numbers in the matrix.

For example, the numbers 0, 1, 2, . . . , 23 of the 24 sub-blocks are arranged in order from left to right and from top to bottom to form a 6×4 matrix, and through the arrangement, a number matrix of the sub-blocks is obtained:

```
 0  1  2  3
 4  5  6  7
 8  9 10 11
12 13 14 15
16 17 18 19
20 21 22 23
```

For example, the 24 interleaved logical candidate elements are mapped, according to columns, to the sub-blocks corresponding to the numbers in the number matrix of the sub-blocks, and a mapping result is shown in the following table.

| 24 interleaved logical candidate elements | Numbers of the sub-blocks in the number matrix that is mapped to | 24 interleaved logical candidate elements | Numbers of the sub-blocks in the number matrix that is mapped to |
|---|---|---|---|
| 0 | 0 | 3 | 2 |
| 6 | 4 | 9 | 6 |
| ⑫ | 8 | ⑮ | 10 |
| 18 | 12 | 21 | 14 |
| 1 | 16 | 4 | 18 |
| 7 | 20 | 10 | 22 |
| ⑬ | 1 | ⑯ | 3 |
| 19 | 5 | 22 | 7 |
| 2 | 9 | 5 | 11 |
| 8 | 13 | 11 | 15 |
| ⑭ | 17 | ⑰ | 19 |
| 20 | 21 | 23 | 23 |

It can be seen from the above table that: logistics resources, to which the 6 logical candidate elements are mapped, are a sub-block 8, a sub-block 1, a sub-block 17, a sub-block 10, a sub-block 3, and a sub-block 19.

The sub-block 8 is a first sub-block of a PRB pair 4, the sub-block 1 is a second sub-block of a PRB pair 0, the sub-block 17 is a second sub-block of a PRB pair 9, the sub-block 10 is a third sub-block of the PRB pair 4, the sub-block 3 is a fourth sub-block of the PRB pair 0, and the sub-block 19 is a fourth sub-block of the PRB pair 9.

A method for a UE to receive the control channel is substantially the same as that in the foregoing embodiment, and a difference lies in that an interleaving method and a mapping method adopted by the UE side are methods adopted by the base station in this Embodiment 8.

Embodiment 9

This embodiment is substantially the same as Embodiment 8, and a difference lies in that after index numbers 0, 1, 2, . . . , 23 of 24 logical candidate elements are written into a first matrix according to rows, column interchanging is further performed. Specifically, a second column and a fifth column of the first filled matrix in Embodiment 8 are interchanged to obtain the first filled matrix after the interchanging:

```
 0  4  2  3  1  5
 6 10  8  9  7 11
12 16 14 15 13 17
18 22 20 21 19 23
```

After reading is performed according to columns, 24 interleaved logical candidate elements are obtained: 0, 6, ⑫, 18, 4, 10, ⑯, 22, 2, 8, ⑭, 20, 3, 9, ⑮, 21, 1, 7, ⑬, 19, 5, 11, ⑰, and 23.

The 24 interleaved logical candidate elements are mapped, according to columns, to the sub-blocks corresponding to the numbers in the number matrix of the sub-blocks in Embodiment 8, and a mapping result is shown in the following table.

| 24 interleaved logical candidate elements | Numbers of the sub-blocks in the number matrix that is mapped to | 24 interleaved logical candidate elements | Numbers of the sub-blocks in the number matrix that is mapped to |
|---|---|---|---|
| 0 | 0 | 3 | 2 |
| 6 | 4 | 9 | 6 |
| ⑫ | 8 | ⑮ | 10 |
| 18 | 12 | 21 | 14 |
| 4 | 16 | 1 | 18 |
| 10 | 20 | 7 | 22 |
| ⑯ | 1 | ⑬ | 3 |
| 22 | 5 | 19 | 7 |
| 2 | 9 | 5 | 11 |
| 8 | 13 | 11 | 15 |
| ⑭ | 17 | ⑰ | 19 |
| 20 | 21 | 23 | 23 |

It can be seen from the above table that the obtained mapping result is the same as that in Embodiment 8.

A method for a UE to receive the control channel is substantially the same as that in the foregoing embodiment, and a difference lies in that an interleaving method and a mapping method adopted by the UE side are methods adopted by the base station in this Embodiment 9.

Embodiment 10

In this embodiment, an interleaving manner of 24 logical candidate elements may be the method provided in Embodiment 8 or the method provided in Embodiment 9, and a difference lies in that a number of a sub-block is replaced with (k, r), where (k, r) represents a $k^{th}$ sub-block in an $r^{th}$ physical resource block, r is virtual numbers of the m physical resource blocks arranged in sequence, k=W, W+1, . . . , W+Y−1, r=J, J+1, . . . , J+m−1, and J and W are both integers. The numbers of the sub-blocks are arranged in order from left to right and from top to bottom to form a number matrix of the sub-blocks, and the 24 interleaved logical candidate elements are mapped, according to rows, to the sub-blocks corresponding to numbers in the number matrix of the sub-blocks.

For ease of description, J and W are both set to be 0 herein.

In this embodiment, Y=4, and m=6. Therefore, the numbers of the 24 sub-blocks are (0,0), (1,0), (2,0), (3,0), (0,1), (1,1), (2,1), (3,1), (0,2), (1,2), (2,2), (3,2), (0,3), (1,3), (2,3), (3,3), (0,4), (1,4), (2,4), (3,4), (0,5), (1,5), (2,5), and (3,5), which are arranged in order from top to bottom and from left to right to obtain the following number matrix:

```
(0,0) (0,1) (0,2) (0,3) (0,4) (0,5)
(1,0) (1,1) (1,2) (1,3) (1,4) (1,5)
(2,0) (2,1) (2,2) (2,3) (2,4) (2,5)
(3,0) (3,1) (3,2) (3,3) (3,4) (3,5)
```

For example, the 24 interleaved logical candidate elements in Embodiment 9 are mapped, according to columns, to the sub-blocks corresponding to the numbers in the number matrix of the sub-blocks in this Embodiment 10, and a mapping result is shown in the following table.

| 24 interleaved logical candidate elements | Numbers of the sub-blocks in the number matrix that is mapped to | 24 interleaved logical candidate elements | Numbers of the sub-blocks in the number matrix that is mapped to |
|---|---|---|---|
| 0 | (0,0) | 3 | (0,3) |
| 6 | (1,0) | 9 | (1,3) |
| ⑫ | (2,0) | ⑮ | (2,3) |
| 18 | (3,0) | 21 | (3,3) |
| 4 | (0,1) | 1 | (0,4) |
| 10 | (1,1) | 7 | (1,4) |
| ⑯ | (2,1) | ⑬ | (2,4) |
| 22 | (3,1) | 19 | (3,4) |
| 2 | (0,2) | 5 | (0,5) |
| 8 | (1,2) | 11 | (1,5) |
| ⑭ | (2,2) | ⑰ | (2,5) |
| 20 | (3,2) | 23 | (3,5) |

It can be intuitively seen from the above table that: logistics resources, to which the 6 logical candidate elements are mapped, are: a sub-block with the number being 2 in a PRB pair with the number being 0 (that is, a third sub-block of a PRB pair 0), a sub-block with the number being 2 in a PRB pair with the number being 1 (that is, a third sub-block of a PRB pair 2), a sub-block with the number being 2 in a PRB pair with the number being 2 (that is, a third sub-block of a PRB pair 4), a sub-block with the number being 2 in a PRB pair with the number being 3 (that is, a third sub-block of a PRB pair 7), a sub-block with the number being 2 in a PRB pair with the number being 4 (that is, a third sub-block of a PRB pair 9), and a sub-block with the number being 2 in a PRB pair with the number being 5 (that is, a third sub-block of a PRB pair 11).

For example, the 24 interleaved logical candidate elements in Embodiment 8 are mapped, according to rows, to the sub-blocks corresponding to the numbers in the number matrix of the sub-blocks in this Embodiment 10, and a mapping result is shown in the following table.

| 24 interleaved logical candidate elements | Numbers of the sub-blocks in the number matrix that is mapped to | 24 interleaved logical candidate elements | Numbers of the sub-blocks in the number matrix that is mapped to |
|---|---|---|---|
| 0 | (0,0) | 3 | (2,0) |
| 6 | (0,1) | 9 | (2,1) |
| ⑫ | (0,2) | ⑮ | (2,2) |
| 18 | (0,3) | 21 | (2,3) |
| 1 | (0,4) | 4 | (2,4) |
| 7 | (0,5) | 10 | (2,5) |
| ⑬ | (1,0) | ⑯ | (3,0) |
| 19 | (1,1) | 22 | (3,1) |
| 2 | (1,2) | 5 | (3,2) |
| 8 | (1,3) | 11 | (3,3) |
| ⑭ | (1,4) | ⑰ | (3,4) |
| 20 | (1,5) | 23 | (3,5) |

It can be intuitively seen from the above table that: logistics resources, to which the 6 logical candidate elements are mapped, are: a sub-block with the number being 0 in a PRB pair with the number being 2 (that is, a first sub-block of a PRB pair 7), a sub-block with the number being 1 in a PRB pair with the number being 0 (that is, a second sub-block of a PRB pair 0), a sub-block with the number being 1 in a PRB pair with the number being 4 (that is, a second sub-block of a PRB pair 9), a sub-block with the number being 2 in the PRB pair with the number being 2 (that is, a third sub-block of the PRB pair 7), a sub-block with the number being 3 in the PRB pair with the number being 0 (that is, a fourth sub-block of the PRB pair 0), and a sub-block with the number being 3 in the PRB pair with the number being 4 (that is, a fourth sub-block of the PRB pair 9).

A method for a UE to receive the control channel is substantially the same as that in the foregoing embodiment, and a difference lies in that an interleaving method and a mapping method adopted by the UE side are methods adopted by the base station in this Embodiment 10.

Embodiment 11

In this embodiment, physical resources configured by a base station for a to-be-transmitted control channel are shown in FIG. 4A and FIG. 4B, and there are 6 PRB pairs, each PRB pair has 4 sub-blocks, and each sub-block can be used for placing 1 eCCE. A set manner for interleaving logical candidate elements may be the method provided in Embodiment 8 or the method provided in Embodiment 9, and a difference lies in that, in this embodiment, an aggregation level of the to-be-transmitted control channel is 2, so that m=6, n=4, c=1, and L=2; C=floor(m×n/c)=24; and Q=floor(C/L)=12. It can be obtained that the 6 PRB pairs have 12 sub-blocks for placing the to-be-transmitted control channel, and the number of candidate control channels is 6.

Correspondingly, 12 logical candidate elements are set, and a first matrix with the number of rows being 2 and the number of columns being 6 is set.

Index numbers 0, 1, 2, . . . , 11 of the 12 logical candidate elements are set, and are written into the first matrix according to rows to obtain a first filled matrix:

$$\begin{matrix} 0 & 1 & 2 & 3 & 4 & 5 \\ 6 & 7 & 8 & 9 & 10 & 11 \end{matrix}$$

A start position of 6 logical candidate elements among the 12 logical candidate elements is determined according to a UE-specific parameter, and is assumed to be 12, and $3^{rd}$ to $8^{th}$ are used as the 6 determined logical candidate elements.

After the index numbers in the first filled matrix are read according to columns, 12 interleaved logical candidate elements are obtained: 0, ⑥, 1, ⑦, 2, ⑧, ③, 9, ④, 10, ⑤, and 11. The numbers marked by circles are the 6 determined logical candidate elements.

According to a sequence of the 6 PRB pairs, numbers of the 24 sub-blocks are set to be 0, 1, 2, . . . , 23, and numbers of the 12 sub-blocks are set to be (k, r), where (k, r) represents a $k^{th}$ sub-block in an $r^{th}$ physical resource block, r is virtual numbers of the m physical resource blocks arranged in sequence, k=W, W+1, . . . , W+Y−1, r=J, J+1, . . . , J+m−1, and J and W are both integers. The numbers of the sub-blocks are arranged in order from left to right and from top to bottom or in order from top to bottom and from left to right to form a number matrix of the sub-blocks, and the 12 interleaved logical candidate elements are mapped, according to rows or according to columns, to the sub-blocks corresponding to numbers in the number matrix of the sub-blocks.

For ease of description, J and W are both set to be 0 herein.

In this embodiment, Y=2, and m=6. Therefore, the numbers of the 12 sub-blocks are (0,0), (1,0), (0,1), (1,1), (0,2), (1,2), (0,3), (1,3), (0,4), (1,4), (0,5), and (1,5), which are arranged in order from top to bottom and from left to right to obtain the following number matrix:

| (0,0) | (0,1) | (0,2) | (0,3) | (0,4) | (0,5) |
|---|---|---|---|---|---|
| (1,0) | (1,1) | (1,2) | (1,3) | (1,4) | (1,5) |

The 12 interleaved logical candidate elements are mapped, according to rows or columns of the matrix formed by the 12 sub-blocks, to the sub-blocks corresponding to the numbers in the matrix.

For example, the 12 interleaved logical candidate elements are mapped, according to rows, to the sub-blocks corresponding to the numbers in the number matrix of the sub-blocks, and a mapping result is shown in the following table.

| 12 interleaved logical candidate elements | Numbers of the sub-blocks in the number matrix that is mapped to | Numbers of sub-blocks included in the sub-blocks |
|---|---|---|
| 0 | (0,0) | 0, 1 |
| ⑥ | (0,1) | 2, 3 |
| 1 | (0,2) | 4, 5 |
| ⑦ | (0,3) | 6, 7 |
| 2 | (0,4) | 8, 9 |
| ⑧ | (0,5) | 10, 11 |
| ③ | (1,0) | 12, 13 |
| 9 | (1,1) | 14, 15 |
| ④ | (1,2) | 16, 17 |
| 10 | (1,3) | 18, 19 |
| ⑤ | (1,4) | 20, 21 |
| 11 | (1,5) | 22, 23 |

It can be seen from the above table that: logistics resources, to which the 6 logical candidate elements are mapped, are a sub-block (0,1), a sub-block (0,3), a sub-block (0,5), a sub-block (1,0), a sub-block (1,2), and a sub-block (1,4).

The sub-block (0,1) is a sub-block 0 and a sub-block 1 of a PRB pair 2, the sub-block (0,3) is a sub-block 0 and a sub-block 1 of a PRB pair 7, the sub-block (0,5) is a sub-block 0 and a sub-block 1 of a PRB pair 11, the sub-block (1,0) is a sub-block 2 and a sub-block 3 of a PRB pair 0, the sub-block (1,2) is a sub-block 2 and a sub-block 3 of a PRB pair 4, and the sub-block (1,4) is a sub-block 2 and a sub-block 3 of a PRB pair 9.

A method for a UE to receive the control channel is substantially the same as that in the foregoing embodiment, and a difference lies in that an interleaving method and a mapping method adopted by the UE side are methods adopted by the base station in this Embodiment 11.

Embodiment 12

In this embodiment, physical resources configured by a base station for a to-be-transmitted control channel are shown in FIG. 4A and FIG. 4B, and there are 6 PRB pairs, each PRB pair has 4 sub-blocks, and each sub-block can be used for placing 1 eCCE. An aggregation level of the to-be-transmitted control channel is 3, and it is assumed that the corresponding number of candidate control channels is 8.

A first matrix with the number of rows being Y and the number of columns being Z is set. P Y=ceil($n/(c \times L)$)=ceil($4/(1 \times 3)$)=2, and Z=m=6.

Q logical candidate elements are set, where Q=floor($m \times n/(c \times L)$)=floor($6 \times 4/(1 \times 3)$)=8.

Numbers 0, 1, 2, . . . , 7 are set for 8 logical candidate elements. $Y \times Z - Q = 6 \times 2 - 8 = 4$ null elements (Null) are set before the number 0, and the 4 Nulls and the numbers 0, 1, 2, . . . , 7 are used as logical filling elements and are written into the first matrix according to rows, so as to obtain a first filled matrix:

| Null | Null | Null | Null | 0 | 1 |
|------|------|------|------|---|---|
| 2    | 3    | 4    | 5    | 6 | 7 |

When reading is performed according to columns, Null is skipped, so as to obtain 8 interleaved logical candidate elements 2, 3, 4, 5, 0, 6, 1, and 7.

For the 6 PRB pairs, the 24 sub-blocks 0, 1, 2, . . . , 23 are grouped according to an order of a PRB pair 0, a PRB pair 2, a PRB pair 4, a PRB pair 7, a PRB pair 9, and a PRB pair 11 to obtain 8 sub-blocks, and a sub-block includes 3 consecutive sub-blocks.

Index numbers of the 8 sub-blocks are sequentially set to be: 0, 1, 2, . . . , 7, 4 Nulls are set before the index number 0 or after the index number 7, and then a number matrix of the sub-blocks is formed in order from left to right and from top to bottom or in order from top to bottom and from left to right.

In this embodiment, after 4 Nulls are set before the index numbers 0, 1, 2, . . . , 7, a number matrix of the sub-blocks, which is shown below, is formed through arrangement in order from left to right and from top to bottom:

| Null | Null | Null | Null | 0 | 1 |
|------|------|------|------|---|---|
| 2    | 3    | 4    | 5    | 6 | 7 |

Then, the 8 interleaved logical candidate elements 2, 3, 4, 5, 0, 6, 1, and 7 are mapped, according to rows or columns of the number matrix of the sub-blocks, to the sub-blocks corresponding to the numbers in the number matrix of the sub-blocks.

In this embodiment, the 8 interleaved logical candidate elements are mapped, according to rows, to the sub-blocks corresponding to the numbers in the number matrix of the sub-blocks, and a result is shown in the following table.

| 8 logical candidate elements | Numbers of sub-blocks that are mapped to | 8 logical candidate elements | Numbers of sub-blocks that are mapped to |
|---|---|---|---|
| 2 | 0 | 0 | 4 |
| 3 | 1 | 6 | 5 |
| 4 | 2 | 1 | 6 |
| 5 | 3 | 7 | 7 |

It can be seen that: the logical candidate element 2 is mapped to the sub-block 0, the logical candidate element 3 is mapped to the sub-block 1, the logical candidate element 4 is mapped to the sub-block 2, the logical candidate element 5 is mapped to the sub-block 3, the logical candidate element 0 is mapped to the sub-block 4, the logical candidate element 6 is mapped to the sub-block 5, the logical candidate element 1 is mapped to the sub-block 6, and the logical candidate element 7 is mapped to the sub-block 7.

In the above embodiment, for interleaving of logical elements, the first matrix may be written into according to rows, and reading is performed according to columns; or, writing may also be performed according to columns, and reading is performed according to rows, which is not repeatedly described herein.

A method for a UE to receive the control channel is substantially the same as that in the foregoing embodiment, and a difference lies in that an interleaving method and a mapping method adopted by the UE side are methods adopted by the base station in this Embodiment 12.

In the above embodiment, each PRB pair can be used for placing an integer number of eCCEs. According to an LTE Release 8/9/10 standard, a certain sub-carrier in a certain OFDM symbol is called a resource element (Resource Element, RE), and an RB includes 84 or 72 REs. If an eCCE needs to be configured on 36 resource elements (resource element, RE) for sending, since the number of REs available in a PRB relates to the number of symbols of a PDCCH and the number of DMRSs and CSI-RSs, a PRB pair cannot be used for placing an integer number of eCCEs. Illustration is provided below in detail through Embodiment 13.

Embodiment 13

In this embodiment, an aggregation level of a to-be-transmitted control channel is 1, physical resources configured by a base station for the to-be-transmitted control channel are still shown in FIG. 4A and FIG. 4B, there are 6 PRB pairs, each PRB pair has 80 sub-blocks, and a sub-block is an RE.

m=6, n=80, c=36, and L=1; C=floor($m \times n/c$)=floor($6 \times 80/36$)=13; and Q=floor($C/L$)=floor($13/1$)=13. It can be obtained that the 6 PRB pairs have 13 sub-blocks for placing the to-be-transmitted control channel, $6 \times 80 - 36 \times 13 = 12$ REs remain, and corresponding to the aggregation level 1, the number of candidate control channels is 6.

A first matrix with the number of rows being Y and the number of columns being Z is set, and Y×Z>13.

For example, it is set that Y=2 and Z=7.

Q logical candidate elements are set, where Q=floor(m×n/(c×L))=floor(6×80/(36×1))=13.

Numbers 0, 1, 2, . . . , 12 are set for 13 logical candidate elements. Y×Z−Q=2×7−13=1 Null is set before the number 0 or after the number 12. In this embodiment, 1 Null is set before the number 0, 4 Nulls and the numbers 0, 1, 2, . . . , 12 are used as logical filling elements and are written into the first matrix according to rows, so as to obtain a first filled matrix:

```
Null  0  1  2  3  4   5
   6  7  8  9 10 11  12
```

It is assumed that 6 logical candidate elements determined according to a UE-specific parameter are logical candidate elements 1 to 6.

After the numbers in the first filled matrix are read according to columns, 13 interleaved logical candidate elements are obtained: ⑥, 0, 7, ①, 8, ②, 9, ③, 10, ④, 11, ⑤, and 12.

It is assumed that the remaining 12 REs in the 6 PRB pairs are in a last PRB pair, that is PRB11, and the remaining 12 REs are removed.

First 13×36 sub-REs in the 6 PRB pairs are grouped according to a sequence to obtain 13 sub-blocks, and a sub-block includes 36 consecutive REs.

Figure 13:
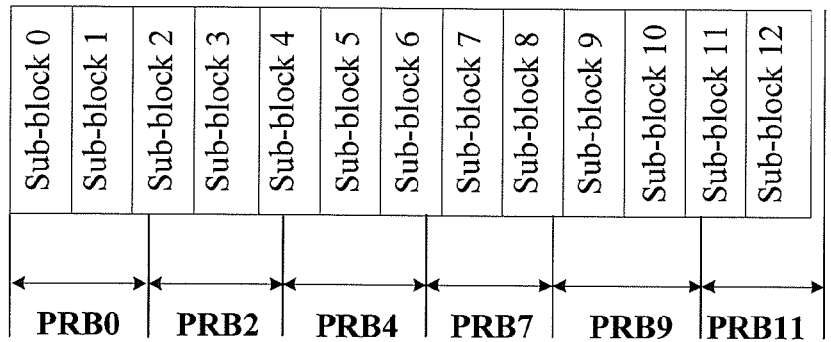
FIG. 13 is a schematic configuration diagram of a physical resource in a method for transmitting a control channel according to Embodiment 13 of the present invention.

As shown in FIG. 13, index numbers of the 13 sub-blocks are sequentially set to be: 0, 1, 2, . . . , 12, 1 Null is set before the index number 0 or after the index number 12, and then a number matrix of the sub-blocks is formed in order from left to right and from top to bottom or in order from top to bottom and from left to right.

In this embodiment, after 1 Null is set before the index numbers 0, 1, 2, . . . , 12, a number matrix of the sub-blocks, which is shown below, is formed through arrangement in order from left to right and from top to bottom:

```
Null  0  1  2  3  4   5
   6  7  8  9 10 11  12
```

Then, the 13 interleaved logical candidate elements 0, 1, 2, 3, 4, 5, 6, 7, 8, 9, 10, 11, and 12 are mapped, according to rows or columns of the number matrix of the sub-blocks, to the sub-blocks corresponding to the numbers in the number matrix of the sub-blocks.

In this embodiment, the interleaved logical candidate elements are mapped, according to rows, to the sub-blocks corresponding to the numbers in the number matrix of the sub-blocks, and a result is shown in the following table.

| 13 logical candidate elements | Numbers of sub-blocks that are mapped to | 8 logical candidate elements | Numbers of sub-blocks that are mapped to |
|---|---|---|---|
| ⑥ | 0 | ③ | 7 |
| 0 | 1 | 10 | 8 |
| 7 | 2 | ④ | 9 |
| ① | 3 | 11 | 10 |
| 8 | 4 | ⑤ | 11 |
| ② | 5 | 12 | 12 |
| 9 | 6 | | |

It can be seen that the 6 determined logical candidate elements 1 to 6 are mapped to the sub-blocks 0, 3, 5, 7, 9, and 1 respectively.

A method for a UE to receive the control channel is substantially the same as that in the foregoing embodiment, and a difference lies in that an interleaving method and a mapping method adopted by the UE side are methods adopted by the base station in this Embodiment 13.

In the foregoing embodiment, DMRS ports 7, 8, 9, and 10 used by the base station for the control channel may have the following manners.

Figure 14:
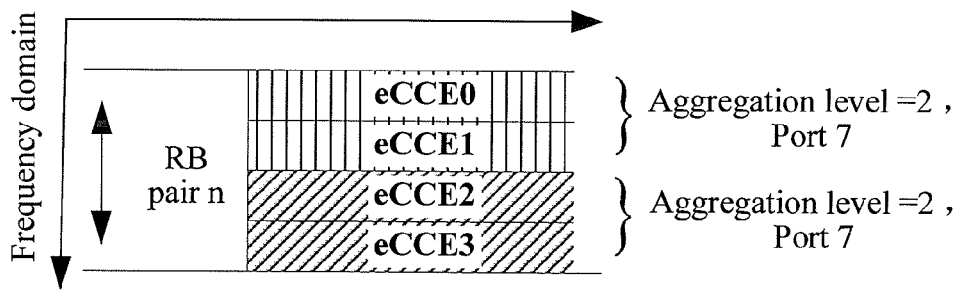
FIG. 14 is a schematic configuration diagram of a first kind of port in a method for transmitting a control channel according to an embodiment of the present invention.

In a first manner, a DMRS port of an ePDCCH is configured semi-statically. As shown in FIG. 14, for a UE1, a DMRS antenna port 7 is configured semi-statically.

Figure 15:
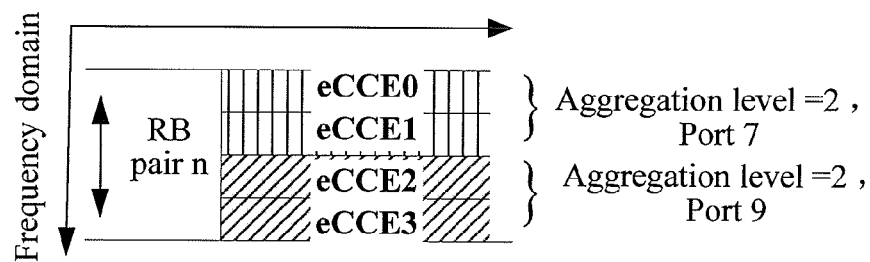
FIG. 15 is a schematic configuration diagram of a second kind of port in a method for transmitting a control channel according to an embodiment of the present invention.

In a second manner, as shown in FIG. 15, in a PRB pair, for a candidate of a certain aggregation level, a DMRS antenna port and the candidate are bound.

Figure 16:
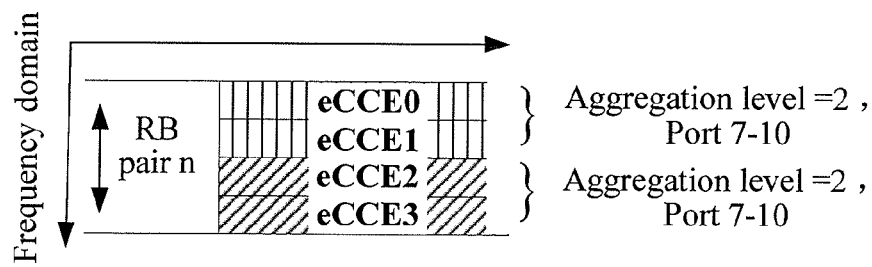
FIG. 16 is a schematic configuration diagram of a third kind of port in a method for transmitting a control channel according to an embodiment of the present invention.

As an improvement, an embodiment of the present invention further provides a third manner. As shown in FIG. 16, each candidate may use any one of DMRS ports, and a position of a candidate control channel in a time-frequency resource and the DMRS port are determined through an interleave matrix.

Figure 17:
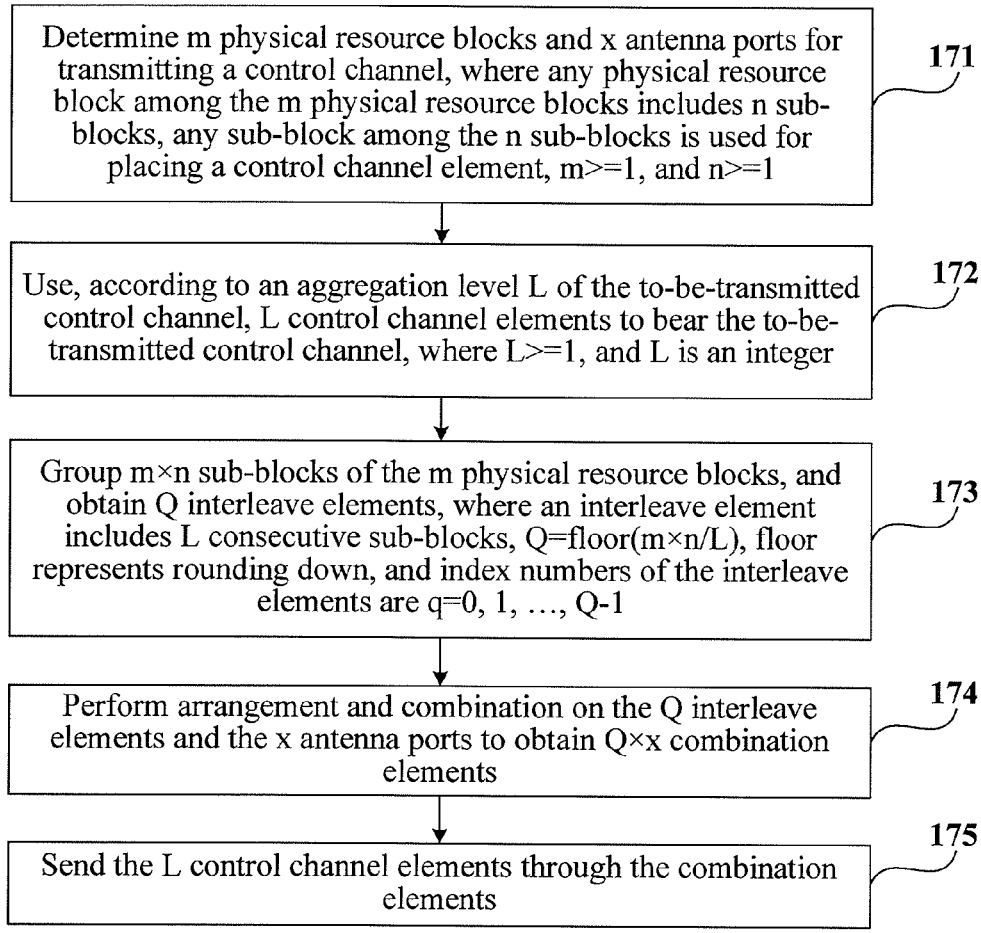
FIG. 17 is a flowchart of another method for transmitting a control channel according to an embodiment of the present invention.

FIG. 17 is a flowchart of another method for transmitting a control channel according to an embodiment of the present invention. The method provided in this embodiment is the foregoing third manner and executed by a base station side, and as shown in FIG. 2, specifically includes:

Operation 171: Determine m physical resource blocks and x antenna ports for transmitting a control channel, where any physical resource block among the m physical resource blocks includes n sub-blocks, any sub-block among the n sub-blocks is used for placing a control channel element, m>=1, and n>=1.

Operation 172: Use, according to an aggregation level L of the to-be-transmitted control channel, L control channel elements to bear the to-be-transmitted control channel, where L>=1, and L is an integer.

Operation 173: Group m×n sub-blocks of the m physical resource blocks, and obtain Q interleave elements, where an interleave element includes L consecutive sub-blocks, Q=floor(m×n/L), floor represents rounding down, and index numbers of the interleave elements are q=0, 1, . . . , Q−1.

Operation 174: Perform arrangement and combination on the Q interleave elements and the x antenna ports to obtain Q×x combination elements.

Operation 175: Send the L control channel elements through the combination elements.

In FIG. 14 to FIG. 16, the aggregation levels of the to-be-transmitted control channels are both 2, 4 eCCEs can be placed in each PRB pair, and each sub-block can be used for placing an eCCE, so that for the aggregation level 2, in a PRB pair, two candidate ePDCCHs can be placed. In FIG. 14, it is configured that an ePDCCH with the aggregation level being 2 of a UE (for example, a UE1) uses a DMRS port 7. In FIG. 15, if the candidate ePDCCH with the aggregation level being 2 is placed in first two sub-blocks of a PRB pair, the DMRS port 7 is used; and if the candidate ePDCCH with the aggregation level being 2 is placed in last two sub-blocks of a PRB pair, a DMRS port 9 is used. In FIG. 16, the candidate ePDCCH with the aggregation level being 2, which is configured by the base station for the UE, is placed in a PRB pair, a used DMRS port may be any one of DMRS ports 7, 8, 9, and 10. However, the one that is specifically used is obtained through an interleave matrix. For example, for this UE, for the ePDCCH with the aggregation level being 2, the base station configures two PRB pairs, and two candidate ePDCCHs with the aggregation level being 2 can be placed in a PRB pair, as shown in FIG. 18.

Figure 18:
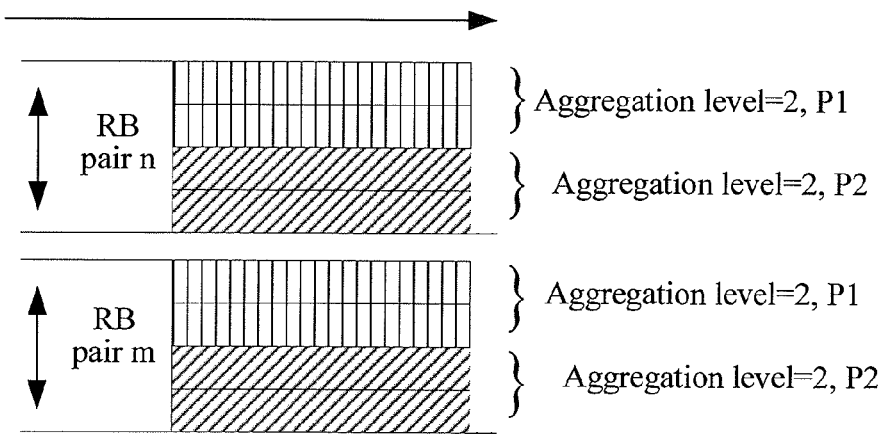
FIG. 18 is a schematic configuration diagram of a logistics resource in another method for transmitting a control channel according to an embodiment of the present invention.

In FIG. 18, a type has 4 positions that can be used for placing a candidate ePDCCH with the aggregation level being 2, which are marked as P1, P2, P3, and P4. A combination of each Pi (i=1, 2, 3, 4) and different DMRS ports forms physical resources of the candidate ePDCCHs with the aggregation level being 2. For the aggregation level 2, physical resources of the possible candidate ePDCCHs are:

(P1, DMRS port 7), (P1, DMRS port 8), (P1, DMRS port 9), (P1, DMRS port 10), (P2, DMRS port 7), (P2, DMRS port 8), (P2, DMRS port 9), (P2, DMRS port 10), (P3, DMRS port 7), (P3, DMRS port 8), (P3, DMRS port 9), (P3, DMRS port 10), (P4, DMRS port 7), (P4, DMRS port 8), (P4, DMRS port 9), (P4, DMRS port 10).

That is to say, there are a total of 16 possibilities, or there are a total of 16 interleave elements, that is, a size of an interleaver is 16. If the number of candidate ePDCCHs with the aggregation level being 2 is 2, after the 16 interleave elements are interleaved, it is determined, according to a UE-specific parameter, that the two candidates are (P1, DMRS port 7) and (P3, DMRS port 9), so that for the ePDCCH with the aggregation level being 2 of the UE, the base station may perform sending on the position P1 and the DMRS port 7 or perform sending on the position P3 and the DMRS port 9.

For the above three ePDCCH DMRS possibilities, in the first manner and the second manner, the size of the interleaver, for a certain aggregation level, is always the number of possible candidate ePDCCHs included in a configured PRB pair. For a certain aggregation level, the size of the interleaver in the third manner is the number of positions that can be used for placing the candidate ePDCCHs and included in a configured pair multiplied by the number of possibly used ports of each position.

A person of ordinary skill in the art can understand that all or a part of the steps of the methods in the embodiments may be implemented by a computer program instructing relevant hardware. The program may be stored in a computer readable storage medium. When the program runs, the steps of the methods in the embodiments are performed. The foregoing storage medium includes any medium that can store program code, such as a ROM, a RAM, a magnetic disk, or an optical disk.

Figure 19:
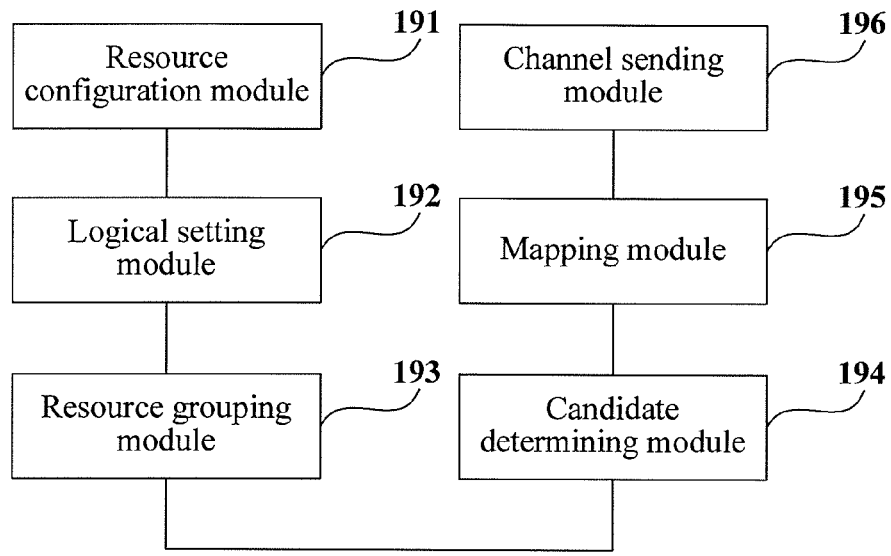
FIG. 19 is a schematic structural diagram of a base station according to an embodiment of the present invention.

FIG. 19 is a schematic structural diagram of a base station according to an embodiment of the present invention. The base station in this embodiment is configured to implement the method provided in the embodiment shown in FIG. 11, and as shown in the drawing, the base station includes:

a resource configuration module 191, configured to determine m physical resource blocks for transmitting a control channel, where any physical resource block among the m physical resource blocks includes n sub-blocks, every c sub-blocks among m×n sub-blocks of the m physical resource blocks are a sub-block group, the sub-block group can be used for placing a control channel element, m>=1, n>=1, and c>=1;

a logical setting module 192, configured to set Q logical candidate elements, where Q=floor(C/L), C=floor(m×n/c) is the number of sub-block groups in the m physical resource blocks, L is an aggregation level of the to-be-transmitted control channel, and floor represents rounding down;

a resource grouping module 193, configured to determine, according to the aggregation level L of the to-be-transmitted control channel, the number M of candidate control channels, and group the m×n sub-blocks in the m physical resource blocks to obtain Q sub-blocks;

a candidate determining module 194, configured to determine M logical candidate elements among the Q logical candidate elements;

a mapping module 195, configured to perform interleaving on the Q logical candidate elements, and map the Q interleaved logical candidate elements to the Q sub-blocks; and a channel sending module 196, configured to send the to-be-transmitted control channel by placing it in a sub-block to which a logical candidate element is mapped, where the logical candidate element is one of the M logical candidate elements.

The candidate determining module is specifically configured to determine, according to a user equipment-specific parameter, the M logical candidate elements among the Q logical candidate elements.

The M logical candidate elements may be M consecutive logical candidate elements.

The resource grouping module is specifically configured to, after cascading the m physical resource blocks according to a sequence of numbers, perform grouping from a first sub-block to obtain the Q sub-blocks, where a sub-block includes L×c consecutive sub-blocks.

The mapping module includes:

a matrix setting sub-module, configured to set a first matrix with the number of rows being Y and the number of columns being Z, where Y and Z are both integers, and Y×Z>=Q;

a resource number setting sub-module, configured to set index numbers of the Q logical candidate elements to be q=I, I+1, . . . , I+Q−1, where I is an integer;

a null element setting sub-module, configured to set Y×Z−Q null elements before the index number q=I of the logical candidate element or set Y×Z−Q null elements after the index number q=I+Q−1 of the logical candidate element to obtain Y×Z logical filling elements, where the Y×Z logical filling elements include the Y×Z−Q null elements and the index numbers I, I+1, . . . , I+Q−1 of the Q logical candidate elements;

an element filling sub-module, configured to write the Y×Z logical filling elements into the first matrix according to rows to obtain a first filled matrix; and an interleaving sub-module, configured to perform, according to row and column positions of the first filled matrix, reading according to columns to obtain the Q interleaved logical candidate elements, where the performing reading according to columns refers to rearranging the index numbers of the Q logical candidate elements in order from top to bottom and from left to right, and during the reading, if a null element exists, the reading skips the element.

Or, the element filling sub-module is configured to write the Y×Z logical filling elements into the first matrix according to columns to obtain a first filled matrix; and the interleaving sub-module is configured to perform, according to row and column positions of the first filled matrix, reading according to rows to obtain the Q interleaved logical candidate elements, where the performing reading according to rows refers to rearranging the index numbers of the Q logical candidate elements in order from left to right and from top to bottom, and during the reading, if a null element exists, the reading skips the element.

The mapping module further includes: an interchanging sub-module, configured to, before the element filling sub-module writes the Y×Z logical filling elements into the first matrix according to rows or according to columns to obtain the first filled matrix, perform, according to columns, interchanging on the first matrix into which the Y×Z logical filling elements are written.

A person skilled in the art should understand that the interchanging may also be performed on the first matrix according to rows.

The number of times of the interchanging may be one and may also be multiple.

The interchanging sub-module includes:

a matrix dividing sub-sub-module, configured to divide an interleave matrix into two parts according to columns, where the interleave matrix is the first matrix into which the Y×Z logical filling elements are written;

a first column interchanging sub-sub-module, configured to, if Z is an even number, interchange a $(2i)^{th}$ column and a $(2i+Z/2)^{th}$ column of the interleave matrix, where i is an integer, and $2<=2i<=Z/2$; or, interchange a $(2i+1)^{th}$ column and a $(2i+Z/2+1)^{th}$ column of the interleave matrix, where $1<=2i+1<=Z/2$, so as to obtain the first filled matrix; and a second column interchanging sub-sub-module, configured to, if Z is an odd number, interchange a $(2j)^{th}$ column and a $(2j+\text{floor}(Z/2))^{th}$ column of the interleave matrix, where j is an integer, and $2<=2j<Z/2$; or, interchange a $(2j+1)^{th}$ column and a $(2j+\text{floor}(Z/2)+1)^{th}$ column of the interleave matrix, where $1<=2j+1<Z/2$, so as to obtain the first filled matrix.

Or, the second column interchanging sub-sub-module is configured to, if Z is an odd number, interchange a $(2j)^{th}$ column and a $(2j+\text{floor}(Z/2))^{th}$ column of the interleave matrix, where $2<=2j<=\text{floor}(Z/2)+1$; or, interchange a $(2j+1)^{th}$ column and a $(2j+\text{floor}(Z/2)+1)^{th}$ column of the interleave matrix, where $1<2j+1<=\text{floor}(Z/2)+1$, so as to obtain the first filled matrix.

Or, the second column interchanging sub-sub-module is configured to, if Z is an odd number, interchange a $(2j)^{th}$ column and a $(2j+\text{floor}(Z/2)+1)^{th}$ column of the interleave matrix, where $2<=2j<Z/2$; or, interchange a $(2j+1)^{th}$ column and a $(2j+\text{floor}(Z/2)+1)^{th}$ column of the interleave matrix, where $1<=2j+1<Z/2$, so as to obtain the first filled matrix.

The mapping module includes:

a first index setting sub-module, configured to set, according to a sequence of the Q sub-blocks, first index numbers q=I, I+1, . . . , I+Q−1 of the Q sub-blocks, where I is an integer;

a first index arranging sub-module, configured to arrange the first index numbers q starting from 1 sequentially from top to bottom and from left to right or sequentially from left to right and from top to bottom, to obtain a second matrix with the number of rows being Y and the number of columns being Z; and a mapping sub-module, configured to map the Q interleaved logical candidate elements to sub-blocks corresponding to the Q first index numbers in the second matrix in order from top to bottom and from left to right or in order from left to right and from top to bottom, where during the mapping, if a null element is encountered, the mapping skips to a next sub-block.

The first index arranging sub-module includes:

a null element setting sub-sub-module, configured to set Y×Z-Q null elements before the index number q=I of the Q sub-blocks to obtain Y×Z physical filling elements, where the Y×Z physical filling elements include the Y×Z-Q null elements and the index numbers q=I, I+1, . . . , I+Q−1 of the Q sub-blocks; and a resource arranging sub-sub-module, configured to arrange the Y×Z physical filling elements sequentially from top to bottom and from left to right or sequentially from left to right and from top to bottom, to obtain the second matrix with the number of rows being Y and the number of columns being Z.

Y=n/(L×c), and Z=m; and correspondingly, the mapping sub-module includes:

a first index replacing sub-sub-module, configured to replace the Q first index numbers q with (k, r), where (k, r) represents a $k^{th}$ sub-block in an $r^{th}$ physical resource block, r is virtual numbers of the m physical resource blocks arranged in sequence, k=W, W+1, W+Y−1, r=J, J+1, . . . , J+m−1, and J and W are both integers; and a mapping sub-sub-module, configured to map the Q interleaved logical candidate elements to sub-blocks corresponding to (k, r) in the second matrix in order from top to bottom and from left to right.

Or, Y=m, and Z=n/(L×c); and correspondingly, the mapping sub-module includes:

a first index replacing sub-sub-module, configured to replace the Q first index numbers q with (k, r), where (k, r) represents a $k^{th}$ sub-block in an $r^{th}$ physical resource block, r is virtual numbers of the m physical resource blocks arranged in sequence, k=W, W+1, . . . , W+Z−1, r=J, J+1, . . . , J+m−1, and J and W are both integers; and a mapping sub-sub-module, configured to map the Q interleaved logical candidate elements to sub-blocks corresponding to (k, r) in the second matrix in order from left to right and from top to bottom.

Figure 20:
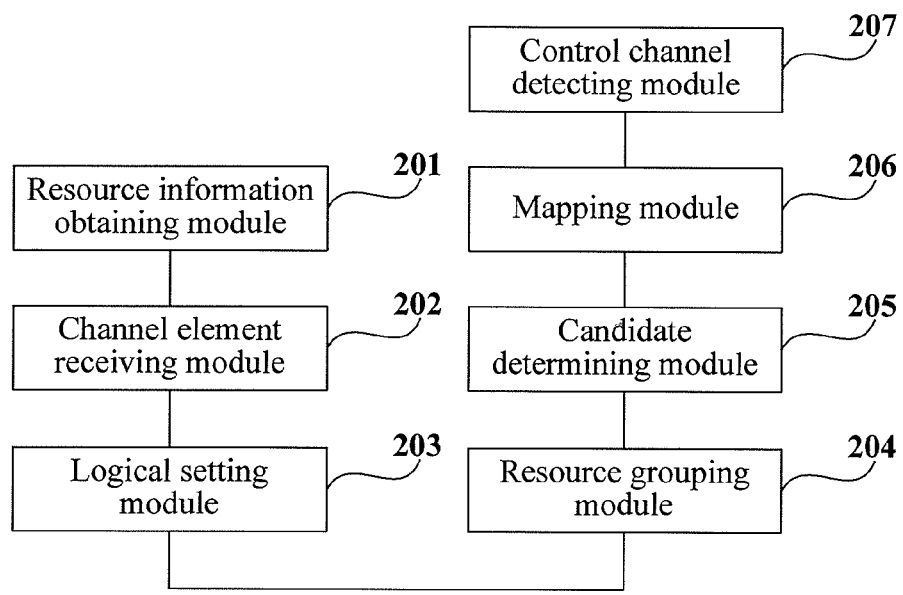
FIG. 20 is a schematic structural diagram of a user equipment for receiving a control channel according to an embodiment of the present invention.

FIG. 20 is a schematic structural diagram of a user equipment for receiving a control channel according to an embodiment of the present invention. In this embodiment, the user equipment is configured to implement the method provided in the embodiment shown in FIG. 12, and as shown in FIG. 20, the user equipment for receiving a control channel includes:

a resource information obtaining module 201, configured to obtain information of m physical resource blocks for transmitting a control channel, where any physical resource block among the m physical resource blocks includes n sub-blocks, every c sub-blocks among m×n sub-blocks of the m physical resource blocks are a sub-block group, the sub-block group can be used for placing a control channel element, m>=1, n>=1, and c>=1;

a channel element receiving module 202, configured to receive, according to the information, control channel elements in the m×n sub-blocks of the m physical resource blocks;

a logical setting module 203, configured to, for an aggregation level $L_K$, set $Q_{L_K}$ logical candidate elements, where $Q_{L_K}=\text{floor}(C/L_K)$, C=floor(m×n/c) is the number of sub-block groups in the m physical resource blocks, $L_K$ is any one of K aggregation levels, and floor represents rounding down;

a resource grouping module 204, configured to determine, according to the aggregation level $L_K$ of the to-be-transmitted control channel, the number $M_{L_K}$ of candidate control channels, and group the m×n sub-blocks in the m physical resource blocks to obtain $Q_{L_K}$ sub-blocks;

a candidate determining module 205, configured to determine $M_{L_K}$ logical candidate elements among the $Q_{L_K}$ logical candidate elements;

a mapping module 206, configured to perform interleaving on the $Q_{L_K}$ logical candidate elements, and map the $Q_{L_K}$ interleaved logical candidate elements to the $Q_{L_K}$ sub-blocks; and a control channel detecting module 207, configured to perform detection on channel control elements placed in $M_{L_K}$ sub-blocks to which the $M_{L_K}$ logical candidate elements are mapped; when a correct control channel is detected, obtain, through parsing, the to-be-received control information from the correct control channel; when no correct control channel is detected, for another aggregation level among the K aggregation levels, continue to execute, starting from the determining the number of corresponding candidate control channels, subsequent steps until a correct control channel is detected or all the control channel elements in the m×n sub-blocks are traversed.

The candidate determining module includes:

determine, according to a user equipment-specific parameter, the $M_{L_K}$ logical candidate elements among the $Q_{L_K}$ logical candidate elements.

The $M_{L_K}$ logical candidate elements may be $M_{L_K}$ consecutive logical candidate elements.

The resource grouping module is specifically configured to, after cascading the m physical resource blocks according to a sequence of numbers, perform grouping from a first sub-block to obtain the $Q_{L_K}$ sub-blocks, where a sub-block includes L×c consecutive sub-blocks.

The mapping module includes:

a matrix setting sub-module, configured to set a first matrix with the number of rows being Y and the number of columns being Z, where Y and Z are both integers, and $Y \times Z \geq Q_{L_K}$;

a resource number setting sub-module, configured to set index numbers of the $Q_{L_K}$ logical candidate elements to be q=I, I+1, . . . , I+$Q_{L_K}$−1, where I is an integer;

a null element setting sub-module, configured to set $Y \times Z - Q_{L_K}$ null elements before the index number q=I of the logical candidate element or set $Y \times Z - Q_{L_K}$ null elements after the index number q=I+$Q_{L_K}$−1 of the logical candidate element to obtain Y×Z logical filling elements, where the Y×Z logical filling elements include the $Y \times Z - Q_{L_K}$ null elements and the index numbers I, I+1, . . . , I+$Q_{L_K}$−1 of the $Q_{L_K}$ logical candidate elements;

an element filling sub-module, configured to write the Y×Z logical filling elements into the first matrix according to rows to obtain a first filled matrix; and an interleaving sub-module, configured to perform, according to row and column positions of the first filled matrix, reading according to columns to obtain the $Q_{L_K}$ interleaved logical candidate elements, where the performing reading according to columns refers to rearranging the index numbers of the $Q_{L_K}$ logical candidate elements in order from top to bottom and from left to right, and during the reading, if a null element exists, the reading skips the element.

Or, the element filling sub-module is configured to write the Y×Z logical filling elements into the first matrix according to columns to obtain a first filled matrix; and the interleaving sub-module is configured to perform, according to row and column positions of the first filled matrix, reading according to rows to obtain the $Q_{L_K}$ interleaved logical candidate elements, where the performing reading according to rows refers to rearranging the index numbers of the $Q_{L_K}$ logical candidate elements in order from left to right and from top to bottom, and during the reading, if a null element exists, the reading skips the element.

The mapping module further includes an interchanging sub-module, configured to, before the element filling sub-module writes the Y×Z logical filling elements into the first matrix according to rows or according to columns to obtain the first filled matrix, perform, according to columns, interchanging on the first matrix into which the Y×Z logical filling elements are written.

A person skilled in the art should understand that the interchanging may also be performed on the first matrix according to rows.

The number of times of the interchanging may be one and may also be multiple.

The interchanging sub-module includes:

a matrix dividing sub-sub-module, configured to divide an interleave matrix into two parts according to columns, where the interleave matrix is the first matrix into which the Y×Z logical filling elements are written;

a first column interchanging sub-sub-module, configured to, if Z is an even number, interchange a $(2i)^{th}$ column and a $(2i+Z/2)^{th}$ column of the interleave matrix, where i is an integer, and $2 \leq 2i \leq Z/2$; or, interchange a $(2i+1)^{th}$ column and a $(2i+Z/2+1)^{th}$ column of the interleave matrix, where $1 \leq 2i+1 \leq Z/2$, so as to obtain the first filled matrix; and a second column interchanging sub-sub-module, configured to, if Z is an odd number, interchange a $(2j)^{th}$ column and a $(2j+\text{floor}(Z/2))^{th}$ column of the interleave matrix, where j is an integer, and $2 \leq 2j < Z/2$; or, interchange a $(2j+1)^{th}$ column and a $(2j+\text{floor}(Z/2)+1)^{th}$ column of the interleave matrix, where $1 \leq 2j+1 < Z/2$, so as to obtain the first filled matrix.

Or, the second column interchanging sub-sub-module is configured to, if Z is an odd number, interchange a $(2j)^{th}$ column and a $(2j+\text{floor}(Z/2))^{th}$ column of the interleave matrix, where $2 \leq 2j \leq \text{floor}(Z/2)+1$; or, interchange a $(2j+1)^{th}$ column and a $(2j+\text{floor}(Z/2)+1)^{th}$ column of the interleave matrix, where $1 < 2j+1 \leq \text{floor}(Z/2)+1$, so as to obtain the first filled matrix.

Or, the second column interchanging sub-sub-module is configured to, if Z is an odd number, interchange a $(2j)^{th}$ column and a $(2j+\text{floor}(Z/2)+1)^{th}$ column of the interleave matrix, where $2 \leq 2j < Z/2$; or, interchange a $(2j+1)^{th}$ column and a $(2j+\text{floor}(Z/2)+1)^{th}$ column of the interleave matrix, where $1 \leq 2j+1 < Z/2$, so as to obtain the first filled matrix.

The mapping module includes:

a first index setting sub-module, configured to set, according to a sequence of the $Q_{L_K}$ sub-blocks, first index numbers q=I, I+1, . . . , I+$Q_{L_K}$−1 of the $Q_{L_K}$ sub-blocks, where I is an integer;

a first index arranging sub-module, configured to arrange the first index numbers q starting from 1 sequentially from top to bottom and from left to right or sequentially from left to right and from top to bottom, to obtain a second matrix with the number of rows being Y and the number of columns being Z; and a mapping sub-module, configured to map the $Q_{L_K}$ interleaved logical candidate elements to sub-blocks corresponding to the $Q_{L_K}$ first index numbers in the second matrix in order from top to bottom and from left to right or in order from left to right and from top to bottom, where during the mapping, if a null element is encountered, the mapping skips to a next sub-block.

The first index arranging sub-module includes:
a null element setting sub-sub-module, configured to set $Y \times Z - Q_{L_K}$ null elements before the index number q=I of the $Q_{L_K}$ sub-blocks to obtain $Y \times Z$ physical filling elements, where the $Y \times Z$ physical filling elements include the $Y \times Z - Q_{L_K}$ null elements and the index numbers q=I, I+1, ..., $Q_{L_K}-1$ of the $Q_{L_K}$ sub-blocks; and a resource arranging sub-sub-module, configured to arrange the $Y \times Z$ physical filling elements sequentially from top to bottom and from left to right or sequentially from left to right and from top to bottom, to obtain the second matrix with the number of rows being Y and the number of columns being Z.

Y=n/(L×c), and Z=m; and correspondingly, the mapping sub-module includes:

a first index replacing sub-sub-module, configured to replace the $Q_{L_K}$ first index numbers q with (k, r), where (k, r) represents a $k^{th}$ sub-block in an $r^{th}$ physical resource block, r is virtual numbers of the m physical resource blocks arranged in sequence, k=W, W+1, ..., W+Y-1, r=J, J+1, ..., J+m-1, and J and W are both integers; and a mapping sub-sub-module, configured to map the $Q_{L_K}$ interleaved logical candidate elements to sub-blocks corresponding to (k, r) in the second matrix in order from top to bottom and from left to right.

Or, Y=m, and Z=n/(L×c); and correspondingly, the mapping sub-module includes:

a first index replacing sub-sub-module, configured to replace the $Q_{L_K}$ first index numbers q with (k, r), where (k, r) represents a $k^{th}$ sub-block in an $r^{th}$ physical resource block, r is virtual numbers of the m physical resource blocks arranged in sequence, k=W, W+1, ..., W+Z-1, r=J, J+1, ..., J+m-1, and J and W are both integers; and a mapping sub-sub-module, configured to map the $Q_{L_K}$ interleaved logical candidate elements to sub-blocks corresponding to (k, r) in the second matrix in order from left to right and from top to bottom.

In the foregoing apparatus embodiment, the logical candidate elements are set, then interleaving is performed on the logical candidate elements, and then the interleaved logical candidate elements are mapped to the physical resource blocks configured by a base station for a to-be-transmitted control channel, so that any candidate control channel of the to-be-transmitted control channel is sent on consecutive time-frequency resources as possible, and meanwhile different candidate control channels are on different PRB pairs as possible. In this way, the base station may have better flexibility during actual sending of the ePDCCH, thereby not only achieving a precoding gain and facilitating better transmission of control information, but also achieving a larger scheduling gain.

Finally, it should be noted that the foregoing embodiments are merely provided for describing the technical solutions of the present invention, but not intended to limit the present invention. Although the present invention is described in detail with reference to the foregoing embodiments, persons of ordinary skill in the art should understand that they may still make modifications to the technical solutions described in the embodiments, or make equivalent replacements to part of or all of the technical features thereof, without departing from the spirit and scope of the technical solutions of the embodiments of the present invention.

What is claimed is:

1. A method for transmitting a control channel, the method comprising:
    determining m physical resource blocks for transmitting a control channel, wherein any physical resource block among the m physical resource blocks comprises n sub-blocks, every c sub-blocks among m×n sub-blocks of the m physical resource blocks are a sub-block group, the sub-block group can be used for placing a control channel element, m>=1, n>=1, and c>=1;
    setting Q logical candidate elements, wherein Q=floor(C/L), C=floor(m×n/c) is the number of sub-block groups in the m physical resource blocks, L is an aggregation level of the to-be-transmitted control channel, and floor represents rounding down;
    determining, according to the aggregation level L of the to-be-transmitted control channel, the number M of candidate control channels, and grouping the m×n sub-blocks in the m physical resource blocks to obtain Q sub-blocks;
    determining M logical candidate elements among the Q logical candidate elements;
    performing interleaving on the Q logical candidate elements, and mapping the Q interleaved logical candidate elements to the Q sub-blocks; and
    sending the to-be-transmitted control channel by placing it in a sub-block to which a logical candidate element is mapped, wherein the logical candidate element is one of the M logical candidate elements.

2. The method according to claim 1, wherein determining M logical candidate elements among the Q logical candidate elements comprises:
    determining, according to a user equipment-specific parameter, the M logical candidate elements among the Q logical candidate elements.

3. The method according to claim 2, wherein the M logical candidate elements are M consecutive logical candidate elements.

4. The method according to claim 1, wherein grouping the m×n sub-blocks in the m physical resource blocks to obtain Q sub-blocks comprises:
    after cascading the m physical resource blocks according to a sequence of numbers, performing grouping from a first sub-block to obtain the Q sub-blocks, wherein a sub-block comprises L×c consecutive sub-blocks.

5. The method according to claim 1, wherein performing interleaving on the Q logical candidate elements comprises:
    setting a first matrix with the number of rows being Y and the number of columns being Z, wherein Y and Z are both integers, and Y×Z>=Q;
    setting index numbers of the Q logical candidate elements to be q=I, I+1, ..., I+Q-1, wherein I is an integer;
    setting Y×Z-Q null elements before the index number q=I of the logical candidate element or setting Y×Z-Q null elements after the index number q=I+Q-1 of the logical candidate element to obtain Y×Z logical filling elements, wherein the Y×Z logical filling elements comprise the Y×Z-Q null elements and the index numbers I, I+1, ..., I+Q-1 of the Q logical candidate elements; and
    writing the Y×Z logical filling elements into the first matrix according to rows to obtain a first filled matrix, and performing, according to row and column positions of the first filled matrix, reading according to columns to obtain the Q interleaved logical candidate elements; or,
    writing the Y×Z logical filling elements into the first matrix according to rows to obtain a first filled matrix, and performing, according to row and column positions of the first filled matrix, reading according to columns to obtain the Q interleaved logical candidate elements.

6. The method according to claim 5, wherein before writing the Y×Z logical filling elements into the first matrix according to rows or according to columns to obtain a first filled matrix, the method further comprises:
performing interchanging according to columns or interchanging according to rows on the first matrix into which the Y×Z logical filling elements are written.

7. The method according to claim 6, wherein performing interchanging according to columns on the first matrix into which the Y×Z logical filling elements are written comprises:
dividing an interleave matrix into two parts according to columns, wherein the interleave matrix is the first matrix into which the Y×Z logical filling elements are written;
if Z is an even number, interchanging a $(2i)^{th}$ column and a $(2i+Z/2)^{th}$ column of the interleave matrix, wherein i is a non-negative integer, and $2<=2i<=Z/2$; or, interchanging a $(2i+1)^{th}$ column and a $(2i+Z/2+1)^{th}$ column of the interleave matrix, wherein $1<=2i+1<=Z/2$, so as to obtain the first filled matrix; and
if Z is an odd number, interchanging a $(2j)^{th}$ column and a $(2j+floor(Z/2))^{th}$ column of the interleave matrix, wherein j is not negative and is an integer, and $2<=2j<Z/2$; or, interchanging a $(2j+1)^{th}$ column and a $(2j+floor(Z/2)+1)^{th}$ column of the interleave matrix, wherein $1<=2j+1<Z/2$, so as to obtain the first filled matrix;
or, if Z is an odd number, interchanging a $(2j)^{th}$ column and a $(2j+floor(Z/2))^{th}$ column of the interleave matrix, wherein $2<=2j<=floor(Z/2)+1$; or, interchanging a $(2j+1)^{th}$ column and a $(2j+floor(Z/2)+1)^{th}$ column of the interleave matrix, wherein $1<2j+1<=floor(Z/2)+1$, so as to obtain the first filled matrix;
or, if Z is an odd number, interchanging a $(2j)^{th}$ column and a $(2j+floor(Z/2)+1)^{th}$ column of the interleave matrix, wherein $2<=2j<Z/2$; or, interchanging a $(2j+1)^{th}$ column and a $(2j+1+floor(Z/2)+1)^{th}$ column of the interleave matrix, wherein $1<=2j+1<Z/2$, so as to obtain the first filled matrix.

8. The method according to claim 5, wherein mapping the Q interleaved logical candidate elements to the Q sub-blocks comprises:
setting, according to a sequence of the Q sub-blocks, first index numbers q=I, I+1, . . . , I+Q-1 of the Q sub-blocks, wherein I is an integer;
arranging the first index number q starting from 1 sequentially from top to bottom and from left to right or sequentially from left to right and from top to bottom, to obtain a second matrix with the number of rows being Y and the number of columns being Z; and
mapping the Q interleaved logical candidate elements to sub-blocks corresponding to the Q first index numbers in the second matrix in order from top to bottom and from left to right or in order from left to right and from top to bottom.

9. The method according to claim 8, wherein arranging the index number q, starting from I, of the Q sub-blocks sequentially from top to bottom and from left to right or sequentially from left to right and from top to bottom, to obtain a second matrix with the number of rows being Y and the number of columns being Z comprises:
setting Y×Z−Q null elements before the index number q=I of the Q sub-blocks to obtain Y×Z physical filling elements, wherein the Y×Z physical filling elements comprise the Y×Z−Q null elements and the index numbers q=I, I+1, . . . , I+Q-1 of the Q sub-blocks; and
arranging the Y×Z physical filling elements sequentially from top to bottom and from left to right or sequentially from left to right and from top to bottom, to obtain the second matrix with the number of rows being Y and the number of columns being Z.

10. The method according to claim 8, wherein Y=n/(L×c), and Z=m; and
mapping the Q interleaved logical candidate elements to sub-blocks corresponding to the Q first index numbers in the second matrix in order from top to bottom and from left to right comprises:
replacing the Q first index numbers q with (k, r), wherein (k, r) represents a $k^{th}$ sub-blocking an $r^{th}$ physical resource block, r is virtual numbers of the m physical resource blocks arranged in sequence, k=W, W+1, . . . , W+Y−1, r=J, J+1, . . . , J+m−1, and J and W are both integers, and
mapping the Q interleaved logical candidate elements to sub-blocks corresponding to (k, r) in the second matrix in order from top to bottom and from left to right.

11. The method according to claim 8, wherein Y=m, and Z=n/(L×c); and
mapping the Q interleaved logical candidate elements to sub-blocks corresponding to the Q first index numbers in the second matrix in order from top to bottom and from left to right comprises:
replacing the Q first index numbers q with (k, r), wherein (k, r) represents a $k^{th}$ sub-block in an $r^{th}$ physical resource block, r is virtual numbers of the m physical resource blocks arranged in sequence, k=W, W+1, . . . , W+Z−1, r=J, J+1, . . . , J+m−1, and J and W are both integers, and
mapping the Q interleaved logical candidate elements to sub-blocks corresponding to (k, r) in the second matrix in order from left to right and from top to bottom.

12. A base station, comprising:
a resource configuration module, configured to determine m physical resource blocks for transmitting a control channel, wherein any physical resource block among the m physical resource blocks comprises n sub-blocks, every c sub-blocks among m×n sub-blocks of the m physical resource blocks are a sub-block group, the sub-block group can be used for placing a control channel element, m>=1, n>=1, and c>=1;
a logical setting module, configured to set Q logical candidate elements, wherein Q=floor(C/L), C=floor(m×n/c) is the number of sub-block groups in the m physical resource blocks, L is an aggregation level of the to-be-transmitted control channel, and floor represents rounding down;
a resource grouping module, configured to, according to the aggregation level L of the to-be-transmitted control channel, determine the number M of candidate control channels, and group the m×n sub-blocks in the m physical resource blocks to obtain Q sub-blocks;
a candidate determining module, configured to determine M logical candidate elements among the Q logical candidate elements;
a mapping module, configured to perform interleaving on the Q logical candidate elements, and map the Q interleaved logical candidate elements to the Q sub-blocks; and
a channel sending module, configured to send the to-be-transmitted control channel by placing it in a sub-block to which a logical candidate element is mapped, wherein the logical candidate element is one of the M logical candidate elements.

13. The base station according to claim 12, wherein the resource grouping module is configured to, after cascading the m physical resource blocks according to a sequence of numbers, perform grouping from a first sub-block to obtain the Q sub-blocks, wherein a sub-block comprises L×c consecutive sub-blocks.

14. The base station according to claim 12, wherein the mapping module comprises:
a matrix setting sub-module, configured to set a first matrix with the number of rows being Y and the number of columns being Z, wherein Y and Z are both integers, and Y×Z>=Q;
a resource number setting sub-module, configured to set index numbers of the Q logical candidate elements to be q=I, I+1, . . . , I+Q−1, wherein I is an integer;
a null element setting sub-module, configured to set Y×Z−Q null elements before the index number q=I of the logical candidate element or set Y×Z−Q null elements after the index number q=I+Q−1 of the logical candidate element to obtain Y×Z logical filling elements, wherein the Y×Z logical filling elements comprise the Y×Z−Q null elements and the index numbers I, I+I, . . . , I+Q−1 of the Q logical candidate elements;
an element filling sub-module, configured to write the Y×Z logical filling elements into the first matrix according to rows to obtain a first filled matrix; and
an interleaving sub-module, configured to perform, according to row and column positions of the first filled matrix, reading according to columns to obtain the Q interleaved logical candidate elements;
or,
the element filling sub-module is configured to write the Y×Z logical filling elements into the first matrix according to columns to obtain a first filled matrix; and
the interleaving sub-module is configured to perform, according to row and column positions of the first filled matrix, reading according to rows to obtain the Q interleaved logical candidate elements.

15. The base station according to claim 14, wherein the mapping module further comprises an interchanging sub-module, configured to, before the element filling sub-module writes the Y×Z logical filling elements into the first matrix according to rows or according to columns to obtain the first filled matrix, perform, according to columns or according to rows, interchanging on the first matrix into which the Y×Z logical filling elements are written.

16. The base station according to claim 15, wherein the interchanging sub-module comprises:
a matrix dividing sub-sub-module, configured to divide an interleave matrix into two parts according to columns, wherein the interleave matrix is the first matrix into which the Y×Z logical filling elements are written;
a first column interchanging sub-sub-module, configured to, if Z is an even number, interchange a $(2i)^{th}$ column and a $(2i+Z/2)^{th}$ column of the interleave matrix, wherein i is an integer, and 2<=2i<=Z/2; or, interchange a $(2i+1)^{th}$ column and a $(2i+Z/2+1)^{th}$ column of the interleave matrix, wherein 1<=2i+1<=Z/2, so as to obtain the first filled matrix; and
a second column interchanging sub-sub-module, configured to, if Z is an odd number, interchange a $(2j)^{th}$ column and a $(2j+floor(Z/2))^{th}$ column of the interleave matrix, wherein j is an integer, and 2<=2j<Z/2; or, interchange a $(2j+1)^{th}$ column and a $(2j+1+floor(Z/2))^{th}$ column of the interleave matrix, wherein 1<=2j+1<Z/2, so as to obtain the first filled matrix;
or, the second column interchanging sub-sub-module is configured to, if Z is an odd number, interchange a $(2j)^{th}$ column and a $(2j+floor(Z/2))^{th}$ column of the interleave matrix, wherein 2<=2j<=floor(Z/2)+1; or, interchange a $(2j+1)^{th}$ column and a $(2j+floor(Z/2)+1)^{th}$ column of the interleave matrix, wherein 1<2j+1<=floor(Z/2)+1, so as to obtain the first filled matrix;
or, the second column interchanging sub-sub-module is configured to, if Z is an odd number, interchange a $(2j)^{th}$ column and a $(2j+floor(Z/2)+1)^{th}$ column of the interleave matrix, wherein 2<=2j<Z/2; or, interchange a $(2j+1)^{th}$ column and a $(2j+1+floor(Z/2)+1)^{th}$ column of the interleave matrix, wherein 1<=2j+1<Z/2, so as to obtain the first filled matrix.

17. The base station according to claim 14, wherein the mapping module comprises:
a first index setting sub-module, configured to set, according to a sequence of the Q sub-blocks, first index numbers q=I, I+1, . . . , I+Q−1 of the Q sub-blocks, wherein I is an integer;
a first index arranging sub-module, configured to arrange the first index numbers q starting from 1 sequentially from top to bottom and from left to right or sequentially from left to right and from top to bottom, to obtain a second matrix with the number of rows being Y and the number of columns being Z; and
a mapping sub-module, configured to map the Q interleaved logical candidate elements to sub-blocks corresponding to the Q first index numbers in the second matrix in order from top to bottom and from left to right or in order from left to right and from top to bottom.

18. The base station according to claim 17, wherein the first index arranging sub-module comprises:
a null element setting sub-sub-module, configured to set Y×Z−Q null elements before the index number q=I of the Q sub-blocks to obtain Y×Z physical filling elements, wherein the Y×Z physical filling elements comprise the Y×Z−Q null elements and the index numbers q=I, I+1, . . . , I+Q−1 of the Q sub-blocks; and
a resource arranging sub-sub-module, configured to arrange the Y×Z physical filling elements sequentially from top to bottom and from left to right or sequentially from left to right and from top to bottom, to obtain the second matrix with the number of rows being Y and the number of columns being Z.

19. The base station according to claim 17, wherein Y=n/(L×c), and Z=m; and
the mapping sub-module comprises:
a first index replacing sub-sub-module, configured to replace the Q first index numbers q with (k, r), wherein (k, r) represents a $k^{th}$ sub-block in an $r^{th}$ physical resource block, r is virtual numbers of the m physical resource blocks arranged in a sequence, k=W, W+1, . . . , W+Y−1, r=J, J+1, . . . , J+m−1, and J and W are both integers, and
a mapping sub-sub-module, configured to map the Q interleaved logical candidate elements to sub-blocks corresponding to (k, r) in the second matrix in order from top to bottom and from left to right.

20. The base station according to claim 17, wherein Y=m, and Z=n/(L×c); and
the mapping sub-module comprises:
a first index replacing sub-sub-module, configured to replace the Q first index numbers q with (k, r), wherein (k, r) represents a $k^{th}$ sub-block in an $r^{th}$ physical resource block, r is virtual numbers of the m physical resource blocks arranged in sequence, k=W, W+1, ..., W+Z−1, r=J, J+1, ..., J+m−1, and J and W are both integers, and a mapping sub-sub-module, configured to map the Q interleaved logical candidate elements to sub-blocks corresponding to (k, r) in the second matrix in order from left to right and from top to bottom.

* * * * *